(12) United States Patent
Shteynberg et al.

(10) Patent No.: US 7,888,881 B2
(45) Date of Patent: Feb. 15, 2011

(54) PULSED CURRENT AVERAGING CONTROLLER WITH AMPLITUDE MODULATION AND TIME DIVISION MULTIPLEXING FOR ARRAYS OF INDEPENDENT PLURALITIES OF LIGHT EMITTING DIODES

(75) Inventors: Anatoly Shteynberg, San Jose, CA (US); Harry Rodriguez, Gilroy, CA (US)

(73) Assignee: Exclara, Inc., Santa Clara, CA (US)

( * ) Notice: Subject to any disclaimer, the term of this patent is extended or adjusted under 35 U.S.C. 154(b) by 1146 days.

(21) Appl. No.: 11/494,440

(22) Filed: Jul. 27, 2006

(65) Prior Publication Data

US 2007/0024213 A1    Feb. 1, 2007

Related U.S. Application Data

(60) Provisional application No. 60/702,813, filed on Jul. 28, 2005.

(51) Int. Cl.
H05B 37/02    (2006.01)
(52) U.S. Cl. .................. 315/291; 315/247; 315/308; 315/360
(58) Field of Classification Search ................. 315/224, 315/247, 250, 255, 258, 277, 283, 291, 307, 315/308, 312, 313, 324, 360, 362
See application file for complete search history.

(56) References Cited

U.S. PATENT DOCUMENTS

| | | | | |
|---|---|---|---|---|
| 5,736,881 | A  * | 4/1998 | Ortiz ........................... | 327/175 |
| 7,023,147 | B2 * | 4/2006 | Colby et al. ................. | 315/291 |
| 7,276,861 | B1 * | 10/2007 | Shteynberg et al. ......... | 315/291 |
| 7,378,805 | B2 * | 5/2008 | Oh et al. ...................... | 315/291 |
| 7,583,035 | B2 * | 9/2009 | Shteynberg et al. ......... | 315/307 |
| 2010/0045187 | A1 * | 2/2010 | Shteynberg et al. ......... | 315/149 |

* cited by examiner

*Primary Examiner*—Thuy Vinh Tran
(74) *Attorney, Agent, or Firm*—Nancy R. Gamburd; Gamburd Law Group LLC

(57) ABSTRACT

Exemplary embodiments provide a system, method and apparatus for regulating current in loads, such as in an array of independent pluralities of light emitting diodes ("LEDs"). An exemplary system comprises a multiplexer adapted to switch current to each independent string of LEDs; a first controller to maintain a substantially constant average current level to the plurality of LEDs; and a second controller to modulate a current amplitude and duration of time division multiplexing for each independent string of LEDs. Another aspect of the system provides for modulating the on time for switching current to maintain a substantially constant average current level and to respond and converge quickly to changing current reference levels.

55 Claims, 16 Drawing Sheets

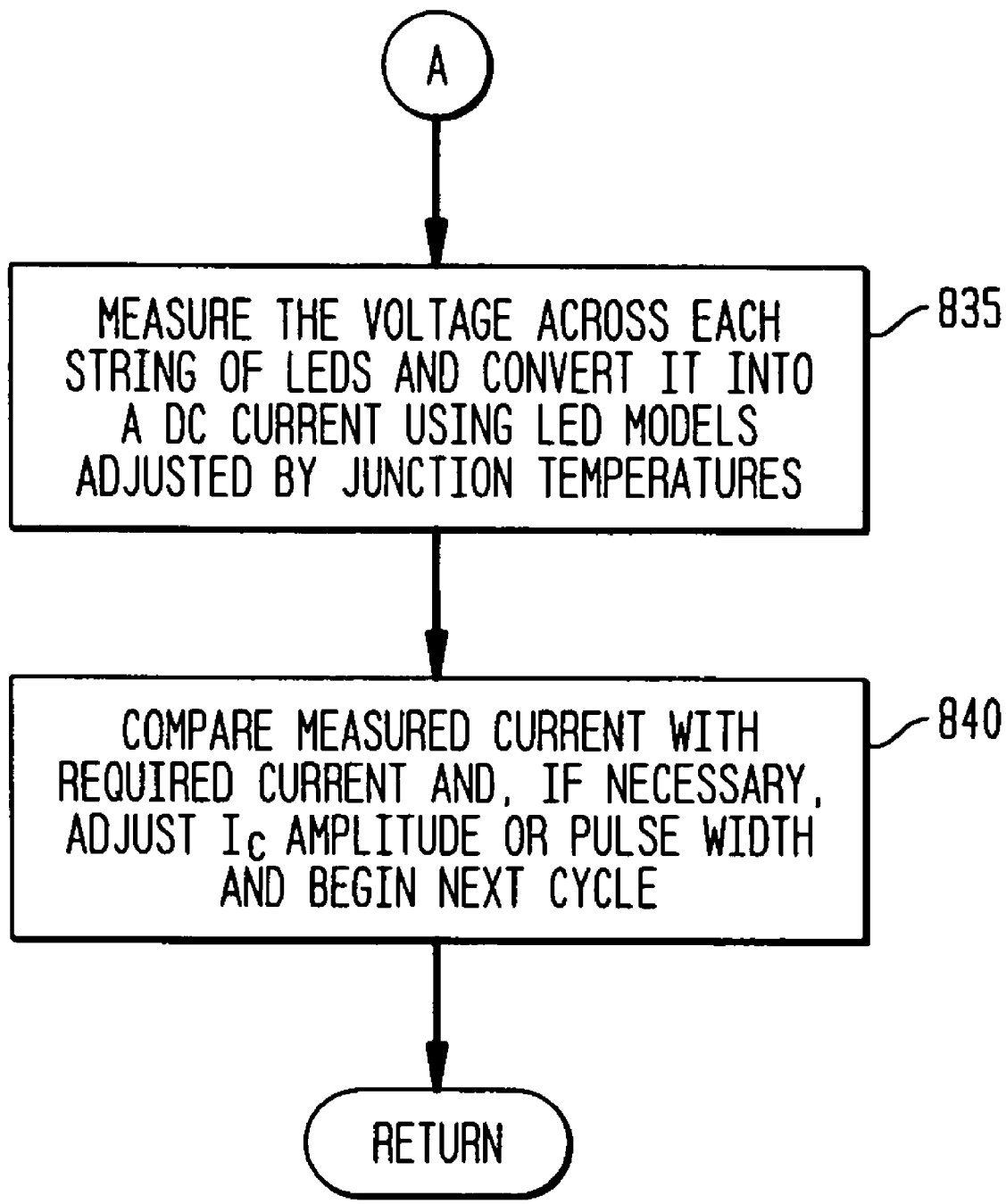

US 7,888,881 B2

PULSED CURRENT AVERAGING CONTROLLER WITH AMPLITUDE MODULATION AND TIME DIVISION MULTIPLEXING FOR ARRAYS OF INDEPENDENT PLURALITIES OF LIGHT EMITTING DIODES

CROSS-REFERENCE TO A RELATED APPLICATION

This application claims priority to and is a conversion of U.S. Provisional Patent Application Ser. No. 60/702,813, filed Jul. 28, 2005, inventors Anatoly Shteynberg and Harry Rodriguez, entitled "Off-line LED Driver with Sliding Mode Control", which is commonly assigned herewith, the contents of which are incorporated herein by reference, and with priority claimed for all commonly disclosed subject matter.

FIELD OF THE INVENTION

The present invention in general is related to power conversion, and more specifically, to a system, apparatus and method for providing a pulsed current averaging control for supplying power to a load, such as for driving light emitting diodes ("LEDs"), and for providing amplitude modulation and time division multiplexing ("TDM") for arrays of independent pluralities of light emitting diodes.

BACKGROUND OF THE INVENTION

A wide variety of off-line LED drivers are known. For example, a capacitive drop off-line LED driver from On Semiconductor (Application Note AND8146/D) is a non-isolated driver with low efficiency, is limited to deliver relatively low power, and at most can deliver a constant current to the LED with no temperature compensation, no dimming arrangements, and no voltage or current protection for the LED.

Other isolated off-line LED drivers also have wide-ranging characteristics, such as a line frequency transformer and current regulator (On Semiconductor Application Note AND 8137/D); a current mode controller (On Semiconductor Application Note AND8136/D: a white LED luminary light control system (U.S. Pat. No. 6,441,558); LED driving circuitry with light intensity feedback to control output light intensity of an LED (U.S. Pat. No. 6,153,985); a non-linear light-emitting load current control (U.S. Pat. No. 6,400,102); a flyback as an LED Driver (U.S. Pat. No. 6,304,464); a power supply for an LED (U.S. Pat. No. 6,557,512); a voltage booster for enabling the power factor controller of a LED lamp upon a low AC or DC supply (U.S. Pat. No. 6,091,614); and an inductor based boost converter (e.g., LT 1932 from Linear Technology or NTC5006 from On-Semiconductor).

In general, these various LED drivers are overly complicated, such as using secondary side signals (feedback loops) which have to be coupled with the controller primary side across the isolation provided by one or more transformers. Many utilize a current mode regulator with a ramp compensation of a pulse width modulation ("PWM") circuit. Such current mode regulators require relatively many functional circuits and while nonetheless continuing to exhibit stability problems when used in the continuous current mode with a duty cycle or ratio over fifty percent. Various prior art attempts to solve these problems utilized a constant off time boost converter or hysteric pulse train booster. While these prior art solutions addressed problems of instability, these hysteretic pulse train converters exhibit other difficulties, such as electromagnetic interference, inability to meet other electromagnetic compatibility requirements, and are comparatively inefficient. Other solutions, such as in U.S. Pat. No. 6,515,434 B1 and U.S. Pat. No. 6,747,420, provide solutions outside the original power converter stages, adding additional feedback and other circuits, which render the LED driver even larger and more complicated.

Accordingly, a need remains to a comparatively high efficiency, stable and electromagnetically compatible LED driver controller for high brightness applications. In addition, such a controller should be included within and provide a process and system for controlling a switching power converter, constructed and arranged for supplying power to one or plurality of LEDs to reduce the size and cost of LED driver. It also would be desirable for the controller to be stable independently and regardless of the current through LED. In addition, the controller should provide a high efficiency LED driver with a reliable protection for driver components and LEDs.

SUMMARY OF THE INVENTION

Exemplary embodiments of the present invention provide a high efficiency, stable and electromagnetically compatible controller for an LED driver for high brightness ("HB") applications. Exemplary embodiments implement a pulsed current averaging methodology, providing finer, more responsive and more resilient control for delivering power to a load such as high brightness LED arrays. In addition, exemplary controllers may be included within and provide a process and system for controlling a switching power converter, constructed and arranged for supplying power to one or plurality of LEDs to reduce the size and cost of LED driver. Exemplary controllers are stable independently and regardless of the current through LED, and may be implemented to provide a high efficiency LED driver with a reliable protection for driver components and LEDs.

Exemplary embodiments may be implemented to provide an effective off-line LED driver having an AC current shaping controller with a comparatively small or minimum number of components. Exemplary embodiments may also utilize off line, non-isolated and transformerless LED drivers, off line isolated LED drivers, and off line non-isolated LED drivers with a high frequency switching transformer. Exemplary embodiments may also be used to control a single stage off-line multistring (RGB) LED driver.

An exemplary method embodiment for regulating current in an electrical load, where the current is provided to the electrical load via a switch and an inductor, comprises: first, providing current to the inductor for a first predetermined period of time; second, following the first predetermined period of time, providing current to the electrical load and determining an average current provided to the electrical load during a second predetermined period of time; third, comparing the average current to a predetermined reference level; when the average current is less than the predetermined reference level, increasing the first predetermined period of time for a next cycle by at least one first predetermined time increment; and when the average current is greater than the predetermined reference level during the second predetermined period of time, determining a third period of time which elapses until the average current becomes less than the predetermined reference level, determining an integer corresponding to a ratio of the third period of time to the second predetermined period of time, and decreasing the first predetermined period of time for the next cycle by the integer multiple of the first predetermined time increment.

The exemplary method may also include, for successive cycles resulting in either consecutive increasing or consecutive decreasing of the first predetermined period of time, correspondingly successively increasing or successively decreasing the first predetermined period of time by a multiple of the first predetermined time increment, the multiple corresponding to the number of successive cycles. In exemplary embodiments, the first predetermined period of time is an on time of the switch, the second predetermined period of time is an off time of the switch, and the third predetermined period of time is a variable delay period between the end of the off time and a start of a next on time of the switch.

Typically, the electrical load is a plurality of light emitting diodes. In other exemplary embodiments, the electrical load is an array of independent pluralities of light emitting diodes of corresponding colors. For this latter case, the exemplary method further includes modulating a current amplitude and duration of time division multiplexing for each independent plurality of light emitting diodes of the array.

In addition, the exemplary method may further include maintaining a substantially constant average current level to the plurality of light emitting diodes of the array; determining an average DC current for expected color and brightness for each independent plurality of light emitting diodes of the array; determining the predetermined reference level as the sum of all DC currents for each independent plurality of light emitting diodes of the array; determining the duration of the time division multiplexing of the current pulse for each independent plurality of light emitting diodes of the array as a product of its corresponding average DC current and cycle time divided by a value of the current corresponding to the predetermined reference level; multiplexing a current source to each independent plurality of light emitting diodes of the array according to the calculated duration of the time division multiplexing of the corresponding current pulse; measuring a voltage across each independent plurality of light emitting diodes of the array, and using the measured voltage and LED models adjusted by junction temperatures, determining a corresponding DC current for each independent plurality of light emitting diodes of the array; and comparing the corresponding DC current to a required current level and correspondingly adjusting the current amplitude or duration of the time division multiplexing.

An exemplary system for regulating current in an electrical load may comprise a converter and a first controller. The converter is couplable to the electrical load, with the converter comprising a switch and an inductor to provide current to the electrical load. The first controller is coupled to the converter, and is adapted to control the switch to provide current to the inductor for a first predetermined period of time and to provide current to the electrical load for a second predetermined period of time. The first controller is further adapted to determine an average current provided to the electrical load during the second predetermined period of time; to compare the average current to a predetermined reference level; the first controller further adapted, when the average current is less than the predetermined reference level, to increase the first predetermined period of time for a next cycle by at least one first predetermined time increment, and when the average current is greater than the predetermined reference level during the second predetermined period of time, to determine a third period of time which elapses until the average current becomes less than the predetermined reference level, to determine an integer corresponding to a ratio of the third period of time to the second predetermined period of time, and to decrease the first predetermined period of time for the next cycle by the integer multiple of the first predetermined time increment.

In exemplary embodiments, the first controller is further adapted, for successive cycles resulting in either consecutive increasing or consecutive decreasing of the first predetermined period of time, to correspondingly successively increase or successively decrease the first predetermined period of time by a multiple of the first predetermined time increment, the multiple corresponding to the number of successive cycles.

When the electrical load is an array of independent pluralities of light emitting diodes of corresponding colors, the exemplary system further includes a second controller couplable to the array, the second controller adapted to modulate a current amplitude and a duration of time division multiplexing for each independent plurality of light emitting diodes of the array. The system also may further comprise a multiplexer coupled to the second controller, the multiplexer adapted to switch current successively to each independent plurality of light emitting diodes of the array.

In exemplary embodiments, the first controller is further adapted to maintain a substantially constant average current level to the plurality of light emitting diodes of the array; the second controller is further adapted to determine an average DC current for expected color and brightness for each independent plurality of light emitting diodes of the array; the first controller or the second controller are further adapted to determine the predetermined reference level as the sum of all DC currents for each independent plurality of light emitting diodes of the array; the second controller is further adapted to determine the duration of the time division multiplexing of a current pulse for each independent plurality of light emitting diodes of the array as a product of its corresponding average DC current and cycle time divided by a value of the current corresponding to the predetermined reference level. In addition, the multiplexer is further adapted to switch a current source to each independent plurality of light emitting diodes of the array according to the calculated duration of the time division multiplexing of the corresponding current pulse. The second controller may be further adapted to measure a voltage across each independent plurality of light emitting diodes of the array, and using the measured voltage and LED models adjusted by junction temperatures, to determine a corresponding DC current for each independent plurality of light emitting diodes of the array; and to compare the corresponding DC current to a required current level and to correspondingly adjust the current amplitude or duration of the time division multiplexing.

Depending upon the selected embodiment, the first controller and the second controller may be embodied as a single controller. The first controller is further adapted to determine the first predetermined period of time, the second predetermined period of time, and the first predetermined time increment as corresponding clock cycles.

In exemplary embodiments, the first controller may further comprise an integrator to determine the average current; a comparator coupled to the integrator, the comparator adapted to compare the average current to the predetermined reference level; and digital logic coupled to the comparator and adapted to determine an increase or a decrease in the first predetermined period of time and further adapted to control an on time of the switch.

An exemplary apparatus for regulating current in an electrical load, with the apparatus couplable to a converter to provide current to the electrical load through a switch and an inductor, comprises digital logic, an integrator, and a comparator. The digital logic is adapted to control the switch to provide current to the inductor for a first predetermined period of time and to provide current to the electrical load for a second predetermined period of time. The integrator is adapted to determine an average current during the second predetermined period of time, and the comparator is adapted to compare the average current to a predetermined reference level. The digital logic is further adapted, when the average current is less than the predetermined reference level, to increase the first predetermined period of time for a next cycle by at least one first predetermined time increment, and when the average current is greater than the predetermined reference level during the second predetermined period of time, to determine a third period of time which elapses until the average current becomes less than the predetermined reference level, to determine an integer corresponding to a ratio of the third period of time to the second predetermined period of time, and to decrease the first predetermined period of time for the next cycle by the integer multiple of the first predetermined time increment.

In exemplary embodiments, the digital logic is further adapted, for successive cycles resulting in either consecutive increasing or consecutive decreasing of the first predetermined period of time, to correspondingly successively increase or successively decrease the first predetermined period of time by a multiple of the first predetermined time increment, the multiple corresponding to the number of successive cycles.

When the electrical load is an array of independent pluralities of light emitting diodes of corresponding colors, the apparatus may further comprise an array controller couplable to the array, the array controller adapted to modulate a current amplitude and duration of time division multiplexing for each independent plurality of light emitting diodes of the array. For the exemplary embodiments, the apparatus may further comprise a multiplexer coupled to the array controller, with the multiplexer adapted to switch current successively to each independent plurality of light emitting diodes of the array.

The digital logic may be further adapted to maintain a substantially constant average current level to the plurality of light emitting diodes of the array. The array controller may be further adapted to determine an average DC current for expected color and brightness for each independent plurality of light emitting diodes of the array. The digital logic or the array controller may be further adapted to determine the predetermined reference level as the sum of all DC currents for each independent plurality of light emitting diodes of the array. The array controller may be further adapted to determine the duration of the time division multiplexing of a current pulse for each independent plurality of light emitting diodes of the array as a product of its corresponding average DC current and cycle time divided by a value of the current corresponding to the predetermined reference level. The multiplexer may be further adapted to switch a current source to each independent plurality of light emitting diodes of the array according to the calculated duration of the time division multiplexing of the corresponding current pulse.

In addition, the array controller may be further adapted to measure a voltage across each independent plurality of light emitting diodes of the array, and using the measured voltage and LED models adjusted by junction temperatures, to determine a corresponding DC current for each independent plurality of light emitting diodes of the array; and to compare the corresponding DC current to a required current level and to correspondingly adjust the current amplitude or duration of the time division multiplexing.

Another exemplary method of regulating current in an array of independent pluralities of light emitting diodes of corresponding colors comprises: modulating a current amplitude and a duration of time division multiplexing for each independent plurality of light emitting diodes of the array; and maintaining a substantially constant average current level to the plurality of light emitting diodes of the array.

Another exemplary system for regulating current in an array of independent pluralities of light emitting diodes of corresponding colors comprises: a multiplexer adapted to switch current to each independent plurality of light emitting diodes of the array; a first controller adapted to maintain a substantially constant average current level to the plurality of light emitting diodes of the array; and a second controller coupled to the multiplexer and to the first controller, the array controller adapted to modulate a current amplitude and duration of time division multiplexing of current for each independent plurality of light emitting diodes of the array.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various diagrams, in which:

The objects, features and advantages of the present invention will be more readily appreciated upon reference to the following disclosure when considered in conjunction with the accompanying drawings, wherein like reference numerals are used to identify identical components in the various diagrams, in which:

FIG. 17, divided into FIGS. 17A and 17B, is a flow diagram of an exemplary method embodiment for controlling current to an array or plurality of strings of LEDs in accordance with the teachings of the present invention.

FIG. 18, divided into

DETAILED DESCRIPTION OF EXEMPLARY EMBODIMENTS

Figure 1:
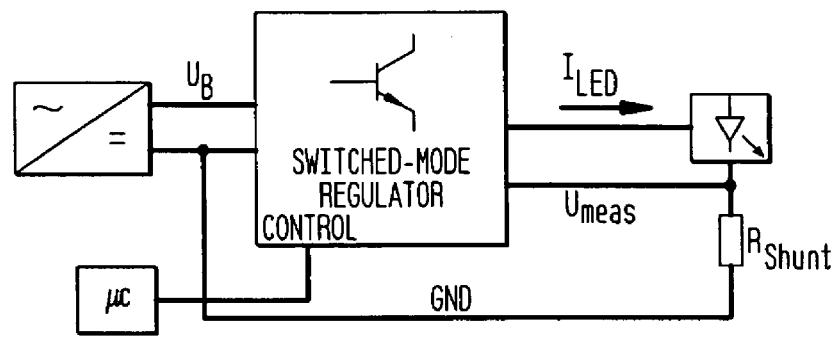
FIG. 1 is a block diagram of a prior art current regulator.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

FIG. 1 is a block diagram of a prior art current regulator 50, such as a current regulator of U.S. Pat. No. 6,747,420 B2. An LED (having a diode-type voltage-current characteristic) presents a very difficult load for voltage-type regulators, which is why LED drivers are typically constructed using a regulated current source, such as current regulator 50. As illustrated, prior art current regulator 50 includes feedback, which is created as a voltage signal proportional to the average LED current. In such switching LED drivers, current through the LED is a stream of high frequency pulses, and the this prior art feedback introduces phase delays, has a poor dynamic response, and further prevents the regulator from acting within one switching cycle.

Figure 2:
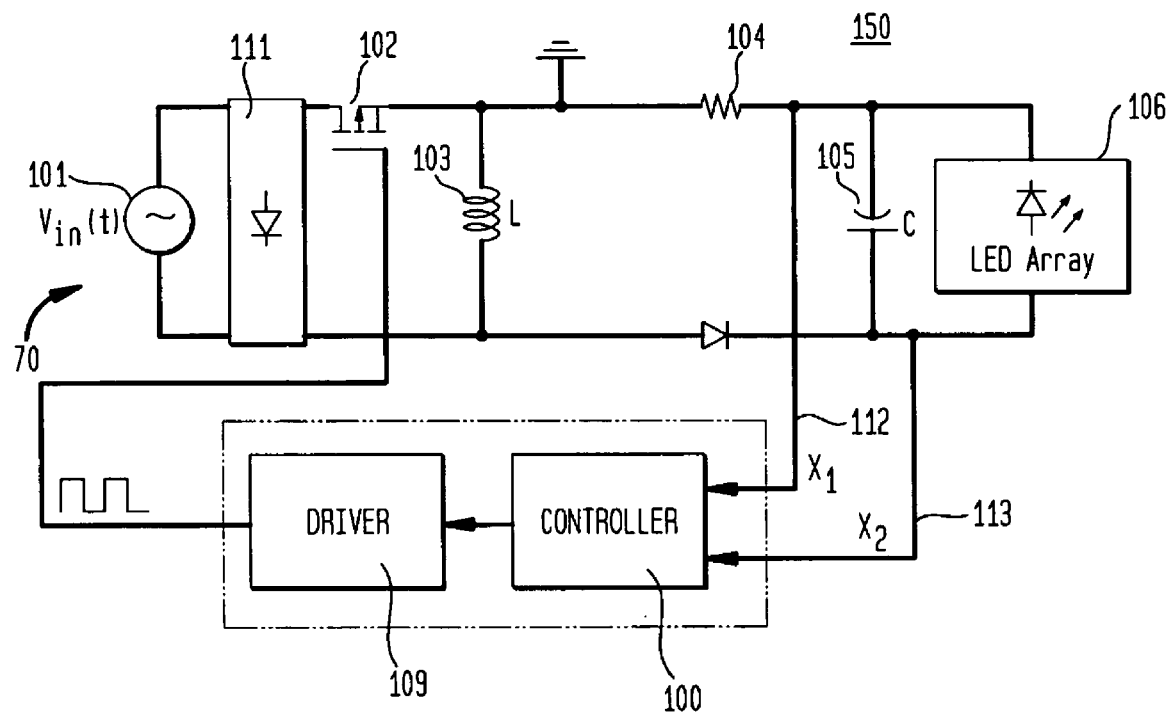
FIG. 2 is a high-level block and circuit diagram of a current regulator (or converter) with an exemplary controller in accordance with the teachings of the present invention.

FIG. 2 is a high-level block and circuit diagram of a current regulator (or converter) with an exemplary controller 100 in accordance with the teachings of the present invention. The exemplary controller 100 may be implemented in a wide variety of ways, including as the controllers 200, 300, 400 and 500 described in detail below. In accordance with the present invention, pulsed current averaging is utilized, and as in many switch-mode power supply topologies, it is possible to measure input or inductor current in order to obtain an accurate estimate of output current. In applications such as those that require output current regulation, like LED drivers, this becomes a powerful tool used in the controller design of the exemplary embodiments. Remarkably, the digital implementation of the inventive approach should not require additional Analog-Digital (A/D) or D/A converters because of some of its unique features discussed below. Thus, it is possible to get advanced digital performance at a substantially reduced monetary cost.

This concept is best explained by example, such as with reference to a Buck-Boost AC-DC converter 70 of FIG. 2, which provides off-line non-isolated AC-DC conversion and has the ability to step-up or step down voltage (also making it usable for wide range of other DC voltage operations). AC voltage source 101 is connected via rectifier 111 to the power switch 102 and inductor 103. Grounded positive rail of the output is connected to the filter capacitor 105 and a plurality of LEDs (LED string or LED array) 106. Resistor 104 is used to sense the output current. The exemplary controller 100 of the present invention (also referred to as a digital "sliding mode" controller) may utilize one or more feedbacks, with two such feedbacks illustrated as current feedback 112 (variable X1) and voltage feedback (113) (variable X2). The off-line LED driver 70 is a step down switching converter, such as having an inductor-based buck-boost topology according to the exemplary embodiments of the invention.

Figure 3:
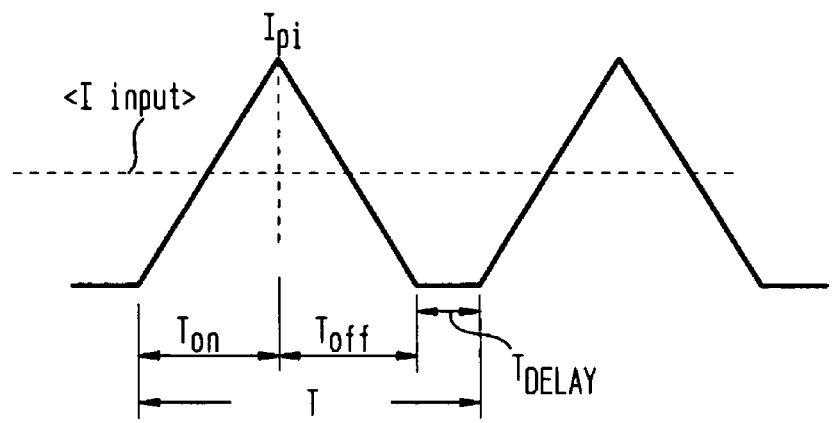
FIG. 3 is a graphical diagram of inductor current in a current regulator (or converter).
Figure 4:
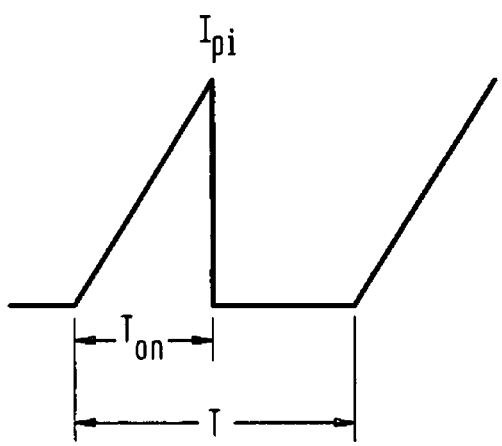
FIG. 4 is a graphical diagram of the primary current in a current regulator (or converter).
Figure 5:
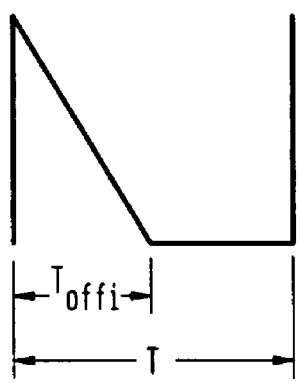
FIG. 5 is a graphical diagram of the secondary side current in a current regulator (or converter).

The performance of such a buck-boost converter is graphically illustrated by FIGS. 3-5, in which FIG. 3 is a graphical diagram of inductor current in a current regulator (or converter), FIG. 4 is a graphical diagram of the primary current in a current regulator (or converter), and FIG. 5 is a graphical diagram of the secondary side current in a current regulator (or converter).

Referring again to FIGS. 2-5, the power switch 102 is turned on and off by the regulator 108 (comprising controller 100 and driver 109), storing energy in the inductor 103 during the switch 102 closed or "on" time period (referred to herein as time period "$T_{ON}$") and discharging the energy into LEDs 106 during the switch 102 open or "off" time period (referred to herein as time period "$T_{OFF}$"), with "T" referring to the total period between successive on/off cycles of the switching of switch 102. While the current in the inductor 103 is illustrated as discontinuous, those of skill in the art will recognize that actual measure currents are likely to be smoother or have other forms. The current (X1) through LEDs 106 represents a stream of high frequency pulses, shaped during off time of the converter 150. When the power switch 102 is closed, energy is stored in the inductor 103, and the inductor current increases to a peak value of "$I_P$" that is determined by the on time of the power switch, the inductor value and input voltage. When the power switch 102 is open, the energy in the inductor 3 is delivered to the load, such as LEDs 106. The inductor current during this time decreases to a value of zero (FIG. 5) which is dependent on the off time of the power switch 102.

In the buck-boost topology of the converter 150, the current through inductor 103 is equal to the input current when the power switch 102 is on (during $T_{ON}$). When the transistor is off and the diodes 106 conduct, the average value of the discharging inductor current (illustrated as "$<I_{INPUT}>$") equals the output current. Thus, in accordance with the exemplary embodiments, controlling the inductor current to the desired shape and value can be utilized to shape the input current to the LEDs 106 and improve the power factor, while at the same time regulating the DC output current.

The exemplary embodiments of the present invention utilize "pulsed current averaging". In the pulsed current averaging, we first assume that the inductor current operates in a discontinuous conduction mode. In this case, the inductor current becomes a periodic waveform. When the transistor (power switch) 102 is on (during $T_{ON}$), the inductor charges and increases according to the differential equation $$\frac{dI_L}{dt} = \frac{1}{L} V_{in}(t).$$

Here we assume ideal operation, such as ideal switching and no inductor resistance, and typical AC voltage input of $V_{in}(t) = |V_m \sin(\omega t)|$. Since the transistor (102) switching frequency is normally substantially higher than the line frequency (>100 times), the input voltage is effectively constant ($V_{in}(t) \approx$ Const.) during each transistor switching cycle (T). As a result, the inductor current appears similar to a triangular waveform illustrated in FIG. 3 on a cycle-by-cycle basis.

A benefit of this operation is that it ideally achieves a unity power factor. Since $V_{in}(t)$ is assumed constant for the power switching transistor 102 on period $T_{ON}$, it is possible to compute the average input current. Using the area of a triangle as equal to ½ base multiplied by its height, we obtain from FIG. 3 (Equation 1):

$$< Ioutput > = \frac{IpiTon}{2T} = \frac{Vin(t)Ton^2}{2TL} = \frac{|Vm\sin(\omega t)|Ton^2}{2TL} \qquad (1)$$

The amplitude of the current is then given by (Equation 2)

$$Im = \frac{VmTon^2}{2TL} \qquad (2)$$

$$Iav = Im\sin\omega t$$

$$PF = 1$$

From the above analysis, it can be seen that the average input current is in phase with the absolute value of the AC voltage input, indicating a theoretical power factor of one (100%), making this topology and mode of operation an excellent candidate for driving a high brightness (HB) LED array.

The average secondary current can be expressed cycle by cycle average value of the time-varying signal x, i.e., $$<x> \equiv \frac{1}{T} \int_{t}^{t+T} x(s) ds,$$

where T denotes the switching period of the power switching transistor 102. In accordance with the exemplary embodiments of the invention, pulse current averaging is used to regulate output current, with the inductor 103 providing current to the load during its off-time ($T_{OFF}$). Thus, by measuring and regulating the inductor current during $T_{OFF}$, the output current is indirectly regulated.

Figure 6:
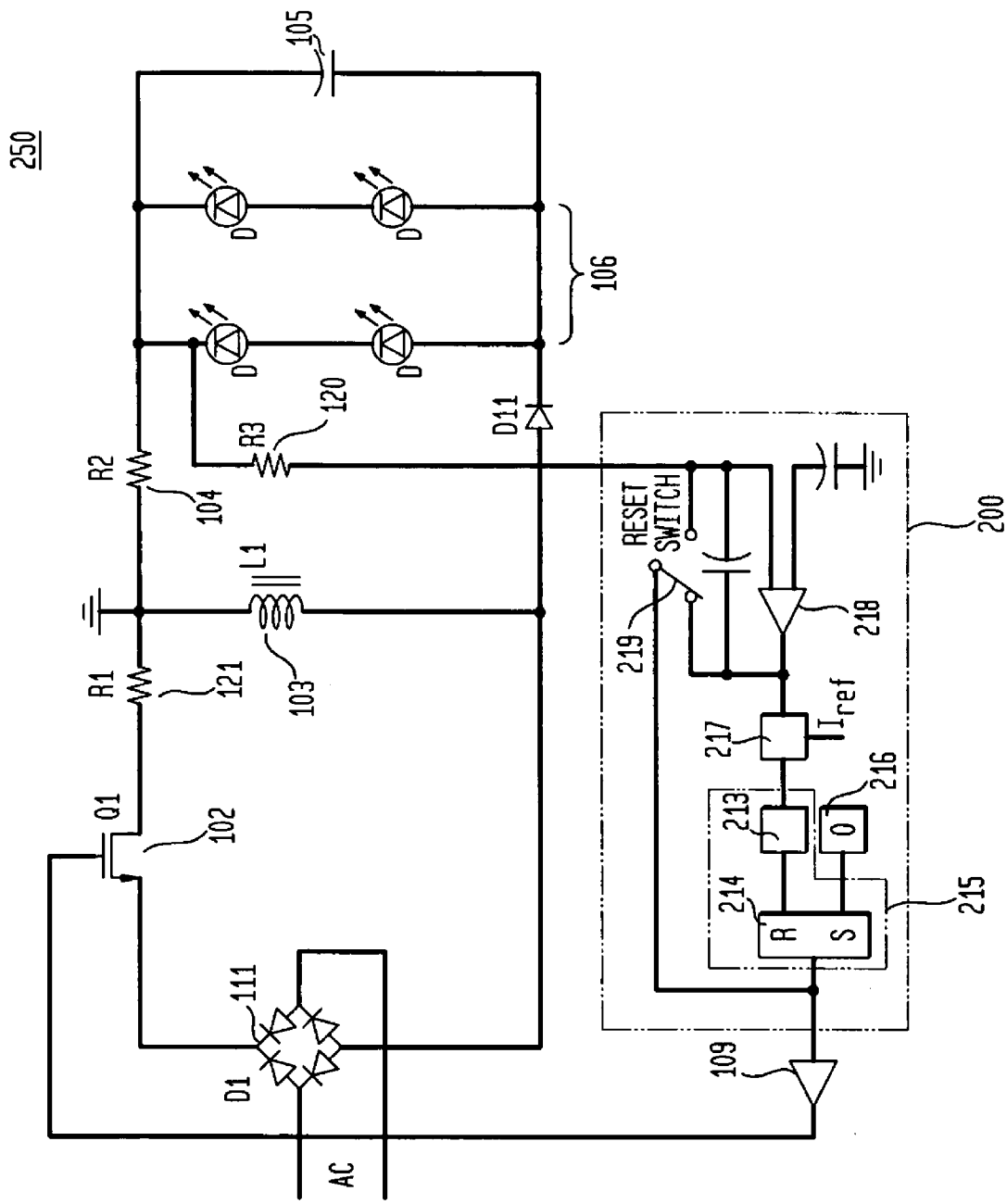
FIG. 6 is a detailed block and circuit diagram of a current regulator with a first exemplary embodiment of a controller in accordance with the teachings of the present invention.

FIG. 6 is a detailed block and circuit diagram of a current regulator with a first exemplary embodiment of a controller 200 in accordance with the teachings of the present invention, and may be utilized as discussed above with respect to controller 100. The first exemplary embodiment of a controller 200 comprises an integrator (with reset) 218, current comparator 217, oscillator 216, and pulse control block 215 (which is illustrated to include a digital logic block 213 and a latch (e.g., RS flip-flop) 214). Depending upon the selected embodiment, the controller 200 may also include the buffer (or amplifier) 209 utilized to drive or otherwise provide a control voltage to the power switching transistor 102, and may also include a reset switch (or reset connection) 219 for the integrator 218. A current feedback ($I_C$) or a voltage feedback ($V_C$), representative of the input current to LEDs 106, is provided to integrator 218 of the controller 200, which integrates LEDs' pulse current during the off-time ($T_{OFF}$) and has an output signal proportional to the LED average current at the end of the off-time $T_{OFF}$, and which is compared with a predetermined or user selected reference current ($I_{REF}$) in comparator 217. In accordance with the present invention, the following analysis illustrates the modeling of the LEDs 106 as a nonlinear load driven from a current source, with regulation of averaged current or voltage at the load.

As in the apparatus 150, the apparatus 250 has a grounded positive rail from the rectifier 111. The grounded positive rail makes easier both the driving of the power switching transistor 102, as a gate voltage is provided with respect to a source at ground, and current measurement through the power switching transistor 102 and LEDs 106, as both are with respect to the same ground potential.

From FIG. 5, the secondary one cycle average current is (Equation 3):

$$Ic = \frac{1}{T} \int_0^T Ipi\left(1 - \frac{t}{Toffi}\right) dt = \frac{IpToff}{2T} \qquad (3)$$

The secondary average current $I_{OUT}$ over a cycle of input AC Voltage is (Equation 4):

$$Ic = \frac{IpiToffi}{2T} \qquad (4)$$

$$ViTon = VcToffi$$

$$Toffi = \frac{ViTon}{Vc}$$

$$I2 = Vi^2 Ton^2/2LTVc = \frac{Vm}{Vc} Im\sin^2\omega ti$$

$$Iout = \frac{1}{\pi} \int_0^{\pi} \frac{Vm}{Vc} Im\sin^2\omega ti d(\omega ti) = \frac{Vm}{2Vc} Im$$

Traditionally, in peak current mode control regulation, a user specifies a reference current, and then the transistor 102 switches off when the inductor current rises to this reference current (minus an appropriate slope compensation to maintain global stability). In the pulsed current averaging of the present invention, however, the length of on-time ($T_{ON}$) of power switching transistor 102 is directly regulated in order create the desired peak value $I_{P1}$. This peak current value is then related to the load output current's average value, providing load current regulation suitable for controlling loads such as LEDs 106.-

The control variable $T_{ON}$ is then related to the output current through the load, as described below. The input power can be equated (ideally) to the output power, as (Equation 5):

$$V_{inRMS} <I_{Input}>_{RMS} = V_{OUT}I_{OUT}. \quad (5)$$

Using the values derived above, the input power is (Equation 6):

$$P_{in} = V_{inRMS} <I_{input}>_{RMS} = \frac{V_m^2 T_{on}}{4TL}. \quad (6)$$

Setting $P_{in}=P_{OUT}$, leads to the relation (Equation 7):

$$I_{OUT} = \frac{V_m^2 T_{on}}{4TLV_{OUT}} \quad (7)$$

As a result, the on-time of the power switching transistor 102 is proportional the output current. By adjusting on time $T_{ON}$, the output current through the load will be increased in a linear relation. Because the output current is inversely proportional to the output voltage in this relation, in systems in which output voltage may quickly deviate from a desired value, prior art regulation methods have utilized advanced nonlinear controllers, such as by utilizing one or more multiplications in controllers to adjust $T_{ON}$. That is, an inner current loop in power factor correction circuits often makes $T_{on} \propto kV_{OUT} (I_{Ref}-I_L)$, providing a more complicated and nonlinear controller because it requires digital multiplication, as well as an additional outer voltage loop (usually PI controller) to help regulate the voltage.

Instead of a such a complicated approach to control, the exemplary embodiments of the present invention use the relation of $T_{ON}$ to $I_{OUT}$, to according to Equation 7, in a hysteretic or sliding mode scheme that simplifies implementations and does not require external A/D converters. The exemplary embodiments of the present invention increase or decrease on time $T_{ON}$ by discrete pulses in order to control the average current being delivered to a load: hence, the terminology pulsed average current control.

This is a significant contrast with conventional methods, which control the current output of commercially available integrated circuits for LED drivers using a combination of analog operational amplifiers and compensation ramp generators. The digital control approach to controlling output currents of the exemplary embodiments of the present invention that does not require these additional parts. In addition, the exemplary embodiments of the present invention are not digital signal processors with software overhead; instead, the exemplary embodiments use an optimized digital logic core employing a sliding control algorithm to determine the amount of power to transfer to the output using a boundary/sliding mode control criteria.

Continuing to refer to FIG. 6, pulsed average current regulation may be implemented using a hysteretic controller, with the methodology described below with reference to controller 200. When oscillator 16 turns on power switching transistor 102, current starts building in the inductor 103; and at the same time, a time register within pulse control block 215 (e.g. within digital logic block 213) is set with a terminal count corresponding to on time $T_{ON}$. When t=$T_{ON}$ (i.e., terminal count (of clock cycles) corresponding to $T_{ON}$ is reached), power switching transistor 102 is turned off, and inductor 103 starts to discharge its stored energy (assuming that the conversion process is or may be discontinuous). The current through LEDs 106 ($I_C$) is sensed and integrated by integrator 218 during the time period in which the power switching transistor 102 is turned off (time period $T_{OFF}$), and the resulting integrated value is sampled by current comparator 217 at the end of the off time $T_{OFF}$ and integrator 218 is reset by reset switch 219. The sampled integrated value is compared in current comparator 217 with the predetermined or user selected reference value of the average LED current $I_{REF}$. When the LED current ($I_C$) is less than the reference current level ($I_{REF}$) ($I_C<I_{REF}$), indicating that the LED current should be increased, the controller 200 (using digital logic block 213 of pulse control block 215) increases the on time $T_{ON}$ of the power switching transistor 102 by a first predetermined amount of time (typically as a predetermined number of clock cycles), $\Delta t_{ON}$, which in general is the unit increment for changing on time $T_{ON}$ in accordance with the exemplary embodiments of the present invention. In the first such iteration, when $I_C<I_{REF}$, on time $T_{ON}$ is increased by one increment of $\Delta t_{ON}$; in subsequent iterations, integer (or other multiples) of $\Delta t_{ON}$ are utilized to provide faster convergence to the target or reference current level, $I_{REF}$. Similarly, when the LED current ($I_C$) is greater than the reference current level ($I_{REF}$) ($I_C>I_{REF}$), indicating that the LED current should be decreased, the controller 200 (using digital logic block 213 of pulse control block 215) decreases the on time $T_{ON}$ of the power switching transistor 102 ($T_{ON}$) by the first predetermined amount of time, $\Delta t_{ON}$; also in subsequent iterations, integer (or other multiples) of $\Delta t_{ON}$ are utilized in decrementing on time $T_{ON}$ to provide faster convergence to the target or reference current level, $I_{REF}$.

Accordingly, the on time $T_{ON}$ stored in the time register (within pulse control block 215) is adjusted by $\pm\Delta t_{ON}$; the speed of changing of on time $T_{ON}\pm\Delta t_{ON}$ is based on the regulator bandwidth. Assuming such bandwidth is comparatively low, then for the duration of the AC cycle $T_{ON}$ is fixed and input current will be modulated by the input sinusoidal voltage, delivering a power factor equal to unity. (The controller 200 keeps $T_{ON}$ constant during a complete (or entire) input voltage cycle and adjusts it if there is an input voltage change.)

For subsequent cycles, if and when the controller 200 detects two or more consecutive cycles with the same sign of $\Delta t_{ON}$ increment (for successive or consecutive increasing or decreasing of the on time $T_{ON}$), the controller 200 may utilize multiples of $+\Delta t_{ON}$ to adjust the on time $T_{ON}$ or may use look up tables to adjust these increments to accelerate convergence of measured $I_C$ signal and reference $I_{REF}$. For example, for successive increases of on time $T_{ON}$, the methodology may first increment by $+\Delta t_{ON}$, followed by $+2\Delta t_{ON}$, followed by $+4\Delta t_{ON}$, etc., or decrement by $-\Delta t_{ON}$, followed by $-2\Delta t_{ON}$, followed by $-4\Delta t_{ON}$, etc.

In addition, referring to FIGS. 3 and 6, the off time $T_{OFF}$ of power switching transistor 102 is also utilized in accordance with the exemplary embodiments of the present invention, particularly for implementation of rapid dimming capability. As illustrated, during the time period $T_{OFF}$, the current through the LEDs 106 will decrease from a peak value to a lower value. Comparing the measured $I_C$ signal to the reference $I_{REF}$, if the current comparator 217 indicates that the LED current is low, as discussed above, the on time $T_{ON}$ of power switching transistor 102 is increased in increments of $\Delta t_{ON}$. If, during the off time $T_{OFF}$ of power switching transistor 102, the current $I_C$ does not go low, indicating that the current $I_C$ is higher than is necessary or desirable, the controller 200 decreases the on time $T_{ON}$ of power switching transistor 102, in increments of $-\Delta t_{ON}$, as a function of a measured time delay. More particularly, the controller 200 does not commence the next on/off cycle of the power switching transistor 102 unless and until the measured $I_C$ signal becomes sufficiently low to be less than the reference level $I_{REF}$. The amount of time between the end of the off time $T_{OFF}$ and the point in time at which the measured $I_C$ signal becomes sufficiently low to be less than the reference level $I_{REF}$ is referred to as $T_{DELAY}$. The on time $T_{ON}$ will be reduced by increments of $-\Delta t_{ON}$, with the increments determined as the integer function of the ratio of the amount delayed in the current cycle ($T_{DELAY}$) to the off time $T_{OFF}$ of power switching transistor 102 of the current cycle (i.e., int[$T_{DELAY}$/$T_{OFF}$]), such that on time $T_{ON}(n)=T_{ON}(n-1)-\Delta t_{ON}$(int[$T_{DELAY}$/$T_{OFF}$]). In addition, with successive changes in the same direction, as discussed previously, additional multiples of the on time increment $-\Delta t_{ON}$(int[$T_{DELAY}$/$T_{OFF}$]) are utilized, providing a more rapid convergence to the selected reference current level $I_{REF}$.

Apparent from the discussion above, the exemplary methodology of the present invention provides a new form of current control, pulsed current averaging, in which the on time $T_{ON}$ is varied, while off time $T_{OFF}$ is generally fixed at steady-state (except for the potential addition of $T_{DELAY}$). As a result, the frequency of the current modulation will change with the variance of the on time $T_{ON}$. This is in sharp contrast to PWM, in which the duty cycle is varied and the frequency is constant.

Figure 7:
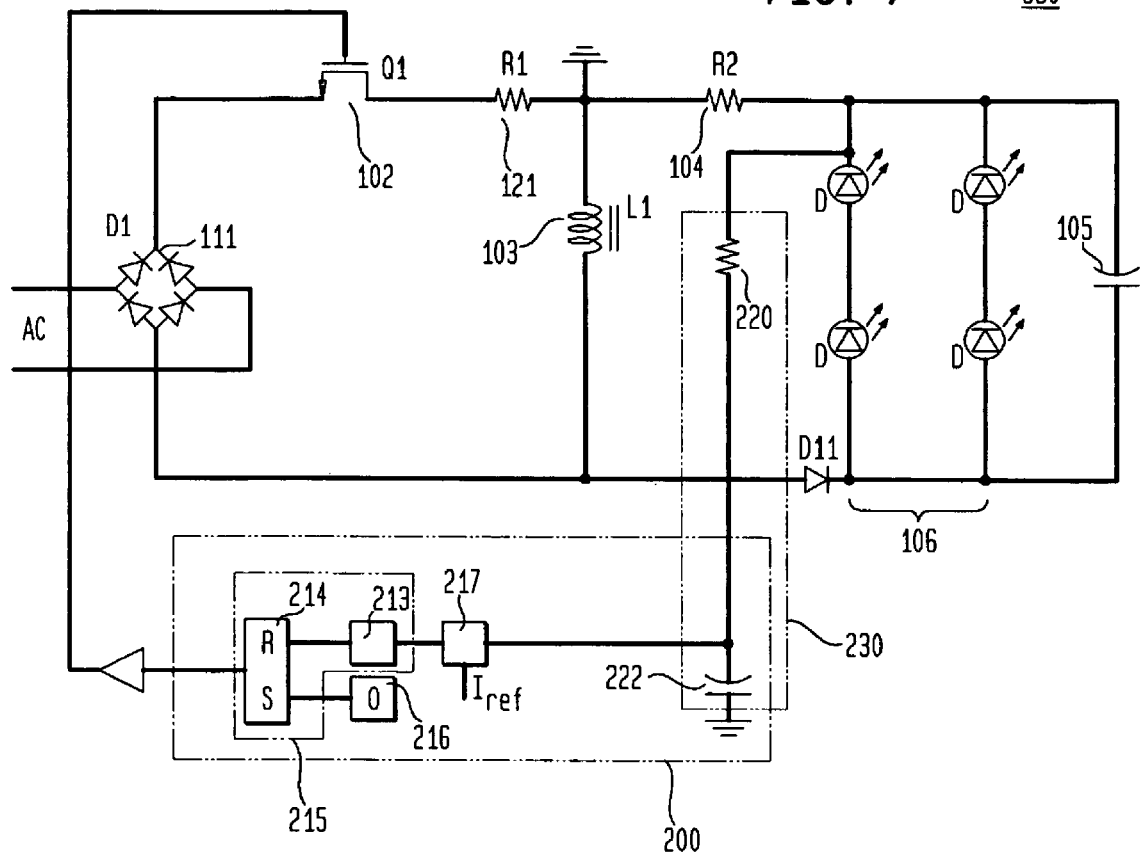
FIG. 7 is a detailed block and circuit diagram of a current regulator with a second exemplary embodiment of a controller in accordance with the teachings of the present invention.

FIG. 7 is a detailed block and circuit diagram of a current regulator with a second exemplary embodiment of a controller 300 in accordance with the teachings of the present invention, and may be utilized similarly and equivalently to the controller 200 previously discussed. Instead of an active integrator 218 with reset switch 219, the controller 300 utilizes a passive R-C filter 230 (resistor 220 and capacitor 222). This controller 300 embodiment simplifies the implementation at the expense of reduced speed of dynamic response of the regulator. In all other respects, the controller 300 functions as described above for controller 200.

Figure 8:
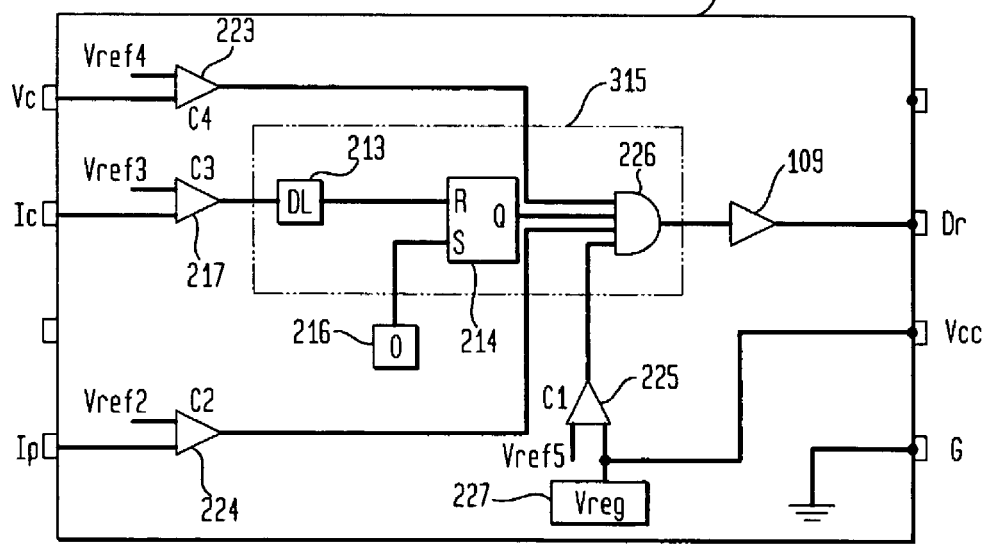
FIG. 8 is a detailed block diagram of a third exemplary embodiment of a controller in accordance with the teachings of the present invention.

FIG. 8 is a detailed block diagram of a third exemplary embodiment of a controller 400 in accordance with the teachings of the present invention, and may be utilized similarly and equivalently to the controllers 200, 300 previously discussed. The controller 400 provides added protections for loads such as LEDs 106, such as with respect to voltage across the LEDs, peak current, and power supply voltage levels. In all other respects, the controller 400 functions as described above for controllers 200, 300.

Figure 10:
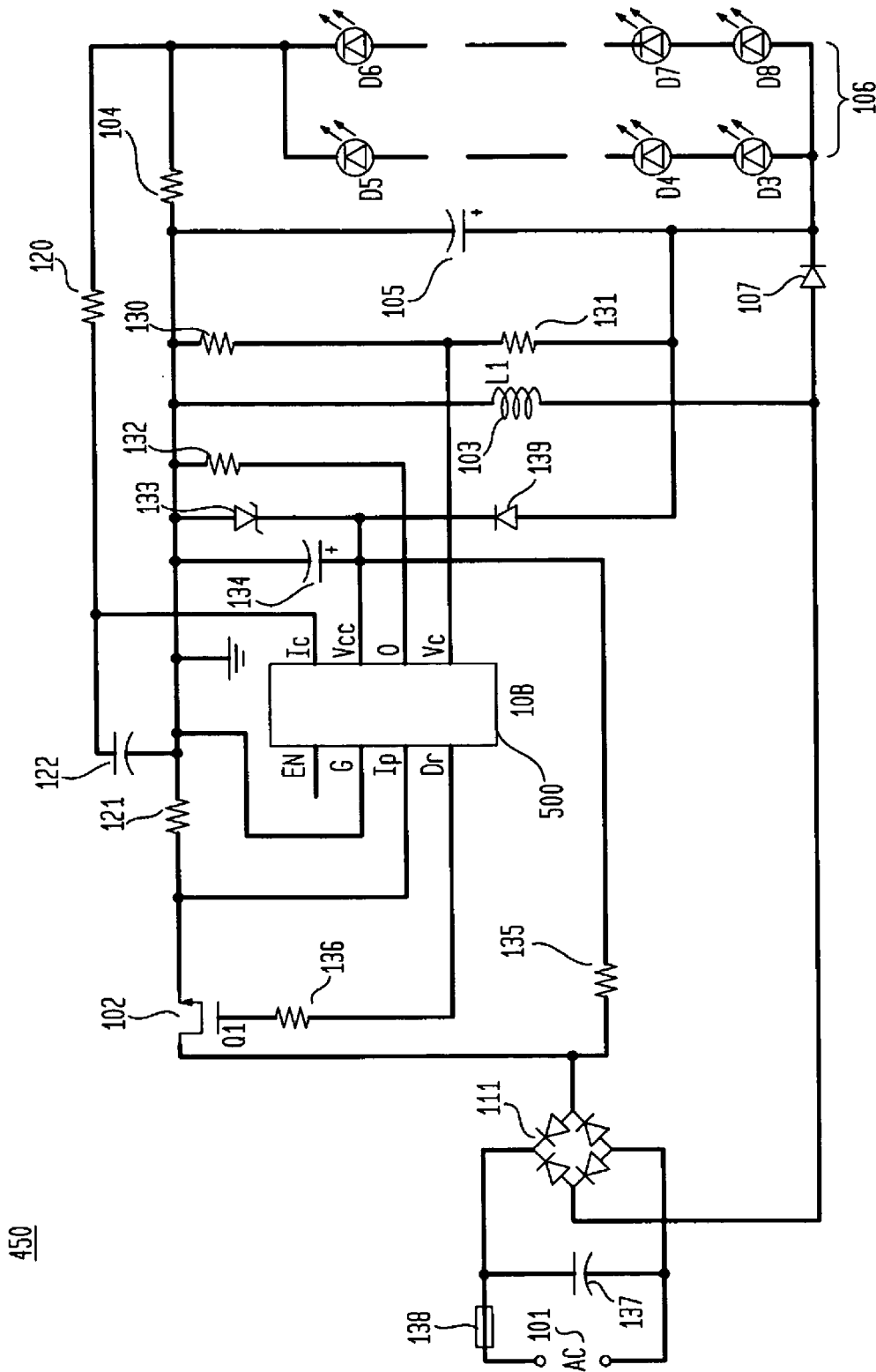
FIG. 10 is a detailed block and circuit diagram of an exemplary current regulator with a fourth exemplary embodiment of a controller in accordance with the teachings of the present invention.

The controller 400 implements a sliding mode regulator with a limited maximum for the on time $T_{ON}$ ($T_{ON}$ max) of the power switching transistor 102, for maximum peak current ($I_P$) in the inductor 103, and for over-voltage protection for the controller 400 (in the event that the input DC supply voltage ($V_{CC}$) is greater than a predetermined threshold), in addition to providing the pulse average current control of the present invention. A peak current ($I_P$) comparator 224 is included within the controller 400. Peak current ($I_P$) comparator 224 is connected (as illustrated in FIG. 10) with its negative terminal to $I_P$ current sensor and it positive terminal to an $I_P$ reference ($V_{REF2}$), and with its output to gate 226 (included within pulse control block 315). A power on reset comparator 225 is included and is connected (also as illustrated in FIG. 10) with its output to the gate 226 and its inputs to the $V_{CC}$ port of the controller 400 and to a voltage regulator 227, enabling the controller 400 to operate in the designed range of $V_{CC}$. The comparator 223 is connected (also as illustrated in FIG. 10) to the output voltage sensor $V_C$ and gate 226 to stop controller 400 converter (apparatus 250) operation when $V_C$ exceeds the reference $V_{REF4}$.

At a high level, the process of or algorithm for regulating the LED 106 current by controller 400 consists of the following steps: (1) enabling operation when power on reset comparator 225 is high and disabling operation when power on reset comparator 225 is low; (2) starting the (next) cycle and setting the time counter register in pulse control block 315 (or 215) to $T_{ON}=T_{ON}\pm\Delta t_{ON}$; (3) at the clock t=0, setting the driver (109) high; (4) for t>0, if the $I_P$ comparator 224 does not go high, indicating peak current is below a predetermined threshold, setting the driver (109) low at the end of the $T_{ON}$ period, and if the $I_P$ comparator 224 does go high, indicating peak current has exceeded the predetermined threshold, setting the driver (109) low immediately; (5) counting t=$T_{ON}$ and at the same time sampling the output current ($I_C$ sense or sensor) comparator 217 before the end of the cycle; (6) if the output current ($I_C$) sensor comparator 217 is high, setting $+\Delta t_{ON}$ at the end of the cycle and starting the next cycle at the expiration of $T_{OFF}$; while if the output current ($I_C$) sensor comparator 217 is low, setting $-\Delta t_{ON}$ at the end of the cycle if the driver (109) was set low by on time counter and $\Delta t_{ON}=0$ if the driver (109) was set low by $I_P$ comparator 224 and starting the new cycle at the expiration of $T_{OFF}$.

Figure 9:
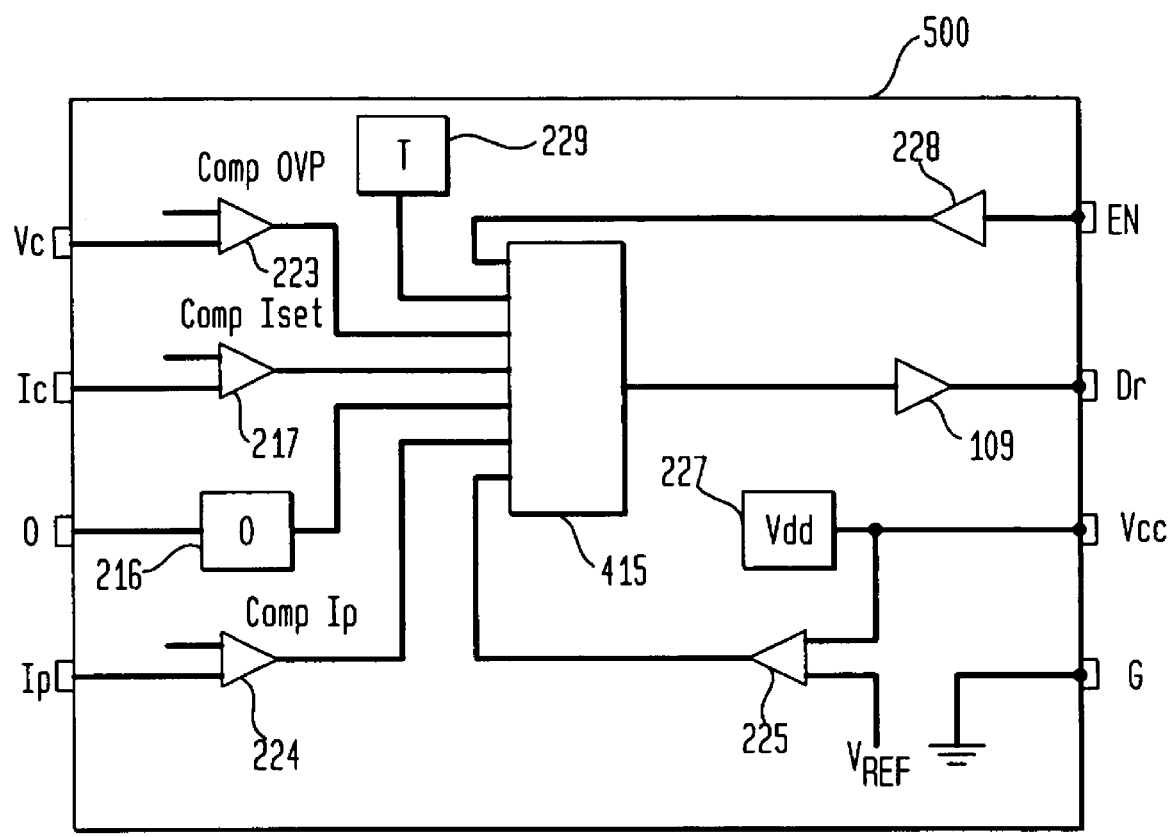
FIG. 9 is a detailed block diagram of a fourth exemplary embodiment of a controller in accordance with the teachings of the present invention.

FIG. 9 is a detailed block diagram of a fourth exemplary embodiment of a controller 500 in accordance with the teachings of the present invention, and may be utilized similarly and equivalently to the controllers 200, 300, 400 previously discussed. In addition to the components discussed previously with respect to the controller 400, the controller 500 further comprises a temperature sensor 229, an enable driver (buffer) 228, with the separate digital logic components (213, 214, 226, 315) consolidated into pulse control block 415 to control the driver (109) for switching of the power switching transistor 102. The temperature sensor 229 to detect and provide a signal to the pulse control block 415 to turn off the controller 500 if the temperature of the controller 500 (i.e., the integrated circuit) exceeds a predetermined temperature threshold. The enable driver (buffer) 228 is utilized for input of an enable signal, to allow or disable operation of the controller 500. In addition, oscillator 216 is connected to an input port as illustrated for input of output frequency adjustments, and the power on reset comparator 225 and voltage regulator 227 are both connected to a $V_{CC}$ rail. The controller 500 is further illustrated in FIG. 10, with corresponding connections or couplings within the converter (apparatus 450).

FIG. 10 is a detailed block and circuit diagram of an exemplary current regulator or converter (450) with the fourth exemplary embodiment of the controller 500 in accordance with the teachings of the present invention. The regulator or converter 450 also utilizes a buck-boost converter topology, and in addition to the features previously discussed, and further comprises: input fuse 138; input EMI filter 137; gate drive resistor 136, connected between power switch 102 and controller 500; primary current sensor across resistor 121, which is connected between power switch 102 and ground; $V_{CC}$ precharge resistor 135, connected between positive port of rectifier 111 and the $V_{CC}$ capacitor 134; $V_{CC}$ protection zener diode 133, connected across the $V_{CC}$ capacitor 134; output voltage sensor 130 and 131 (voltage divider), connected to controller 500; current sense filter 120, 122, connected between current sense resistor 120 and controller 500. In all other respects, the controller 500 functions as described above for controllers 200, 300, 400, and may be utilized similarly and equivalently.

When the input AC voltage 101 is applied, the $V_{CC}$ capacitor 134 is charged via resistor 135 and inductor 103, providing an additional network to precharge the capacitor 134 as ground is connected to the positive rail. When controller 500 is on it starts driving the power switching transistor 102 with voltage building across output 105 (capacitor 105). When this voltage is sufficiently high, it will feed $V_{CC}$ via rectifier diode 139. Enable pin EN is used for enabling or disabling the driver 109 and for LED dimming via PWM.

Figure 11:
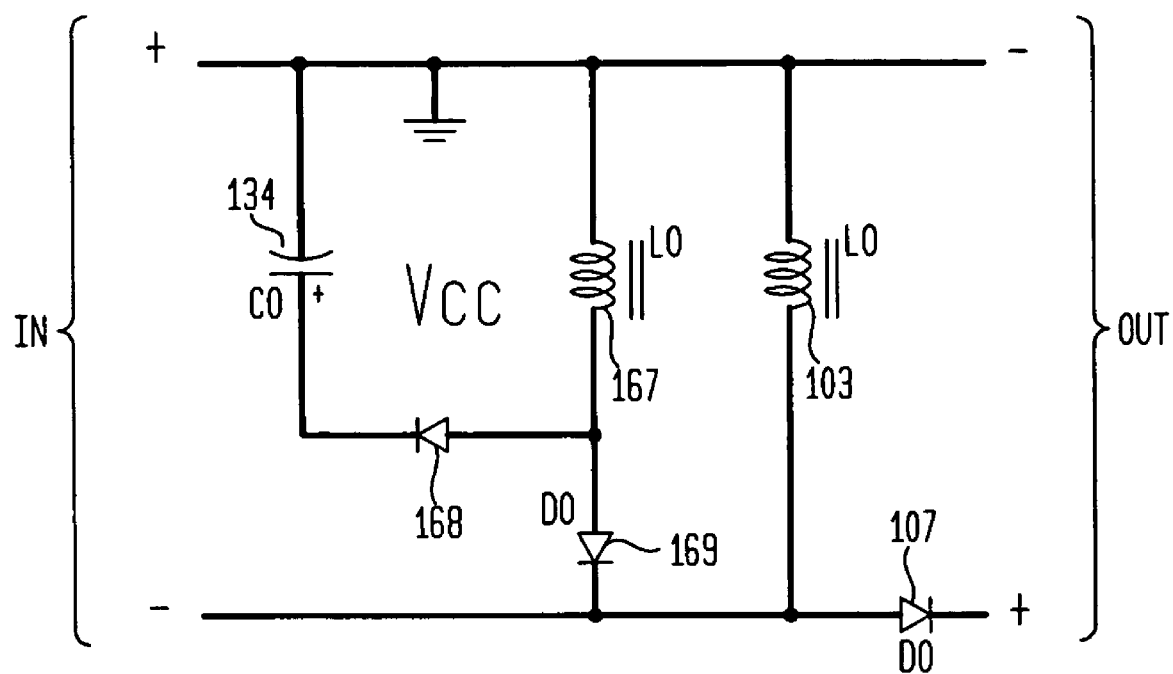
FIG. 11 is a circuit diagram of an inductive voltage divider for use with an exemplary embodiment of a controller in accordance with the teachings of the present invention.

Creating $V_{CC}$ off the output voltage is convenient when the output voltage is slightly over $V_{CC}$. Assuming that the controller 500 may take about 5 mA of $I_{CC}$ current and $V_{CC}$ is about 12 V, this approach may work up to an output voltage of about 20V, giving extra dissipation about 40 mV. At higher output voltages an extra $V_{CC}$ circuit is suggested to limit the power dissipation, such as an exemplary inductive voltage divider 420 illustrated in FIG. 11. As illustrated in FIG. 11, a split $V_{CC}$ inductor 167 is connected in parallel with the main inductor 103 via blocking diode 169, and the positive rail of inductor 167 is connected to the $V_{CC}$ capacitor 134 via rectifier 168. Both inductors 103 and 167 may be part of a buck-boost converter. Because their currents are inversely proportional to their inductances, their inductances should be inversely proportional to the average current they are supplying. Accordingly, for example, if output current is 1.0 A and $I_{CC}$=5 mA, or the ratio between them is 500, then the inductance L of inductor 167=500 the inductance L of inductor 103.

Figure 12:
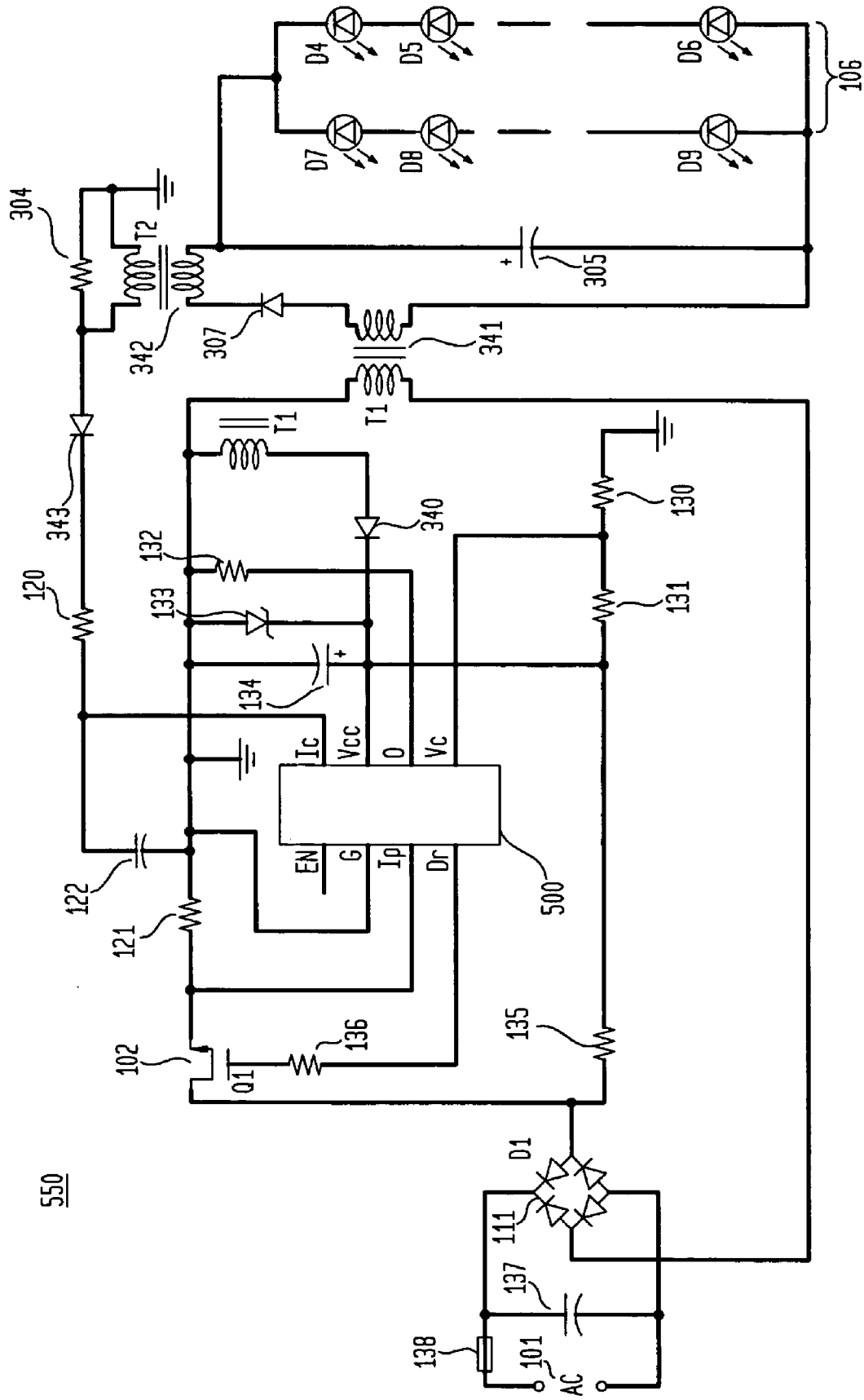
FIG. 12 is a detailed block and circuit diagram of a current regulator with isolation and with a third exemplary embodiment of a controller in accordance with the teachings of the present invention.

FIG. 12 is a detailed block and circuit diagram of a current regulator 550 with isolation and with a fourth exemplary embodiment of a controller 500 in accordance with the teachings of the present invention. The controller 500 also functions as described above, and may be utilized similarly and equivalently to controllers 200, 300, 400. In this embodiment, current regulator 550 provides an isolated off line LED Driver, and further comprises: an isolation transformer 341 with three windings, primary and secondary, connected in a flyback configuration and an auxiliary via blocking diode 340 to power the controller; a current sense transformer 342 connected in series with the flyback rectifier 307 and loaded by a resistor 304 on its secondary side; current sense transformer 342 connected to controller 500 via a blocking diode 343 and R-C filter 120, 122; and output voltage sensor 130, 131 connected across auxiliary winding.

Figure 13:
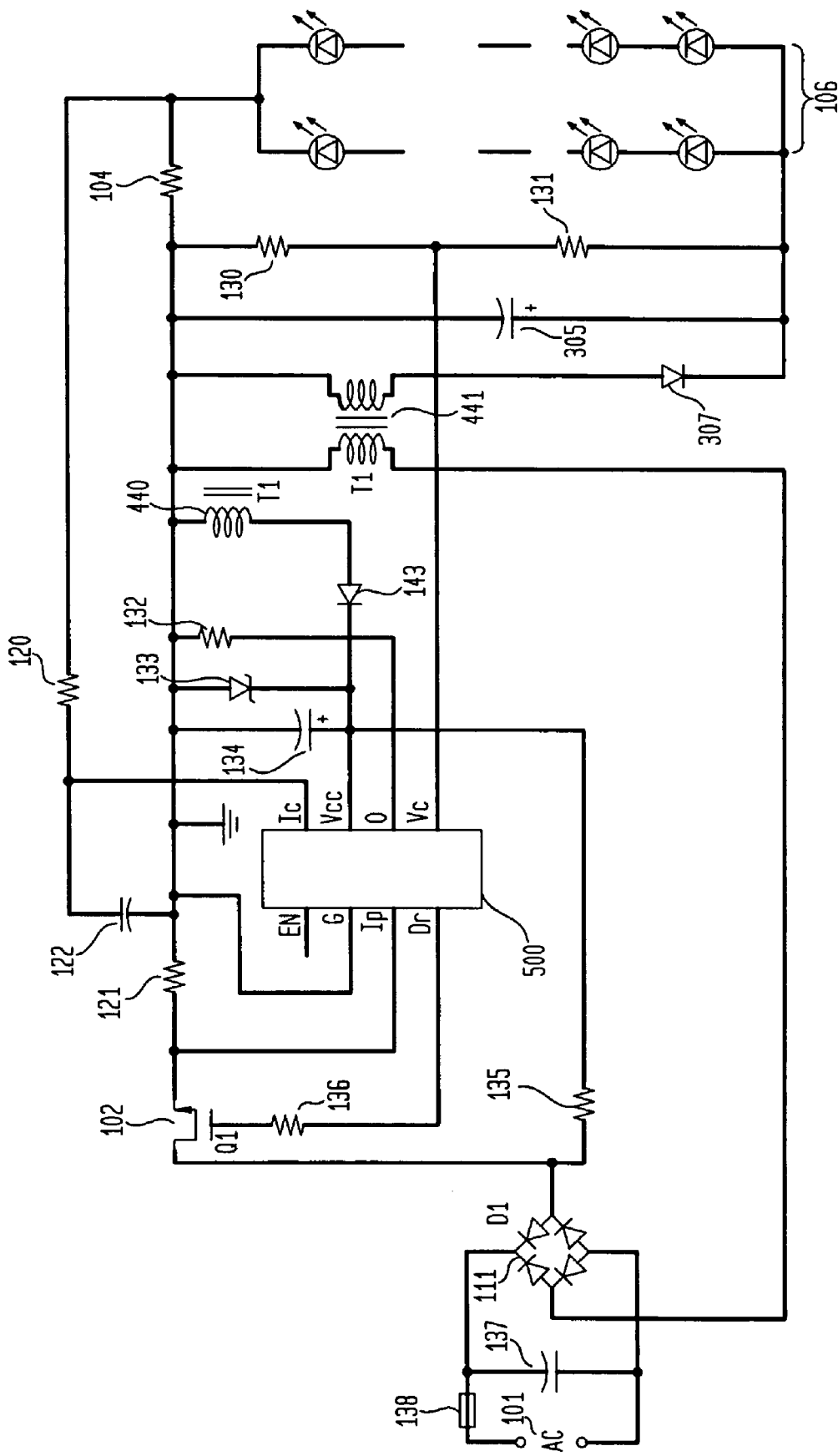
FIG. 13 is a detailed block and circuit diagram of a current regulator with isolation and with a third exemplary embodiment of a controller in accordance with the teachings of the present invention.

FIG. 13 is a detailed block and circuit diagram of a current regulator 650 with partial isolation and with a fourth exemplary embodiment of a controller 500 in accordance with the teachings of the present invention. This configuration provides isolation for current measurement, and functions similarly to current regulator 550, but does not provide full isolation. In addition to controller 500, current regulator 650 comprises: an input fuse 138; input EMI filter 137; rectifier 111, connected to AC line; power switch 102, connected to the positive rail of rectifier 111 and primary current sense resistor 121, which is connected between power switch 102 and ground; gate drive resistor 136, connected between power switch 1022 and controller 500; $V_{CC}$ precharge resistor 135, connected between positive port of rectifier 111 and the $V_{CC}$ capacitor 134; $V_{CC}$ protection zener diode 133, connected across the $V_{CC}$ capacitor 134; output voltage sensor 130 and 131, connected across output filter 105 and to controller 500; secondary current sense filter 120, 122, connected between secondary current sense resistor 104 and controller 500; secondary current sense resistor 104 connected between negative terminal of secondary filter 105 and cathodes of LED strings 106; a switching transformer 441 connected with its primary winding between the negative terminal of rectifier 111 and ground, with secondary winding connected to a rectifier 307 and negative terminal of output filter 305; with auxiliary winding 440 connected to ground and $V_{CC}$ capacitor 134 via rectifier 143.

When power switch 102 is on, the energy from the AC line is stored in the primary winding of transformer 441. During the off state of power switch 102 this energy is released to the filter 305 and strings of LED 106. The primary current in the winding of transformer 441 is generally discontinuous except for a crest of maximum of input voltage. The feedback to the controller 500 is taken from the secondary current sense referenced to the primary ground. It is also referenced to the primary ground primary current sense and output voltage sense.

Figure 14:
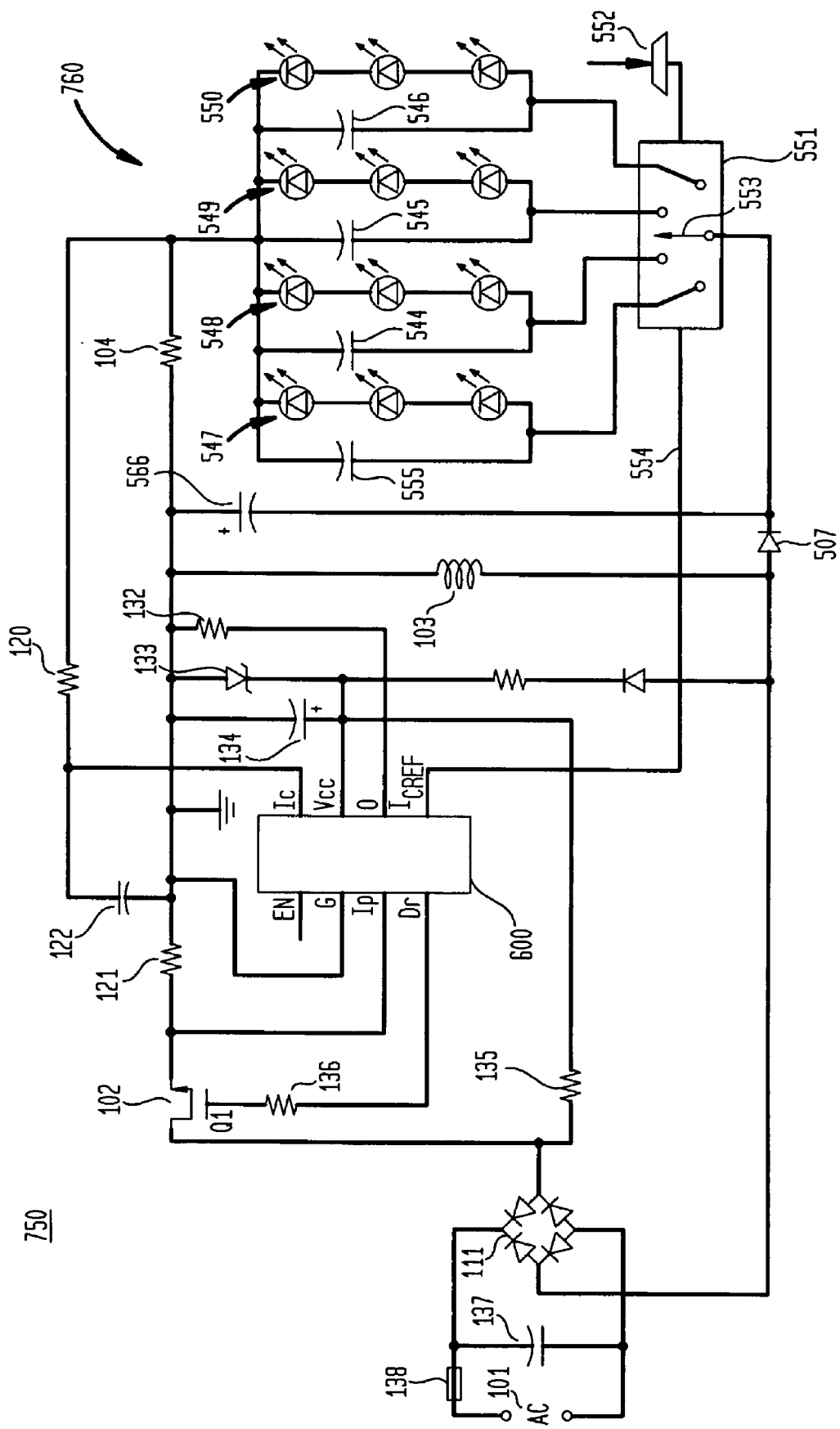
FIG. 14 is a detailed block and circuit diagram of a current regulator with a fourth exemplary embodiment of a controller in accordance with the teachings of the present invention.

FIG. 14 is a detailed block and circuit diagram of a current regulator 750 with a fourth exemplary embodiment of a controller 600 in accordance with the teachings of the present invention. In this exemplary embodiment, the controller 600 provides driving of and power management for a plurality of independent strings or arrays of LEDs 547, 548, 549, and 550, for example, three strings of red, green and blue ("RGB") LEDS or four strings of red, green, blue and amber ("RGBA") LEDS, to generate color controlled light, including white light. This embodiment of current regulator 750 an off-line buck-boost converter 760 with the controller 600, which has an input (analog or digital) to adjust reference of the input current $I_{CREF}$ (on line 554), and in other respects, is similar to controller 500. Each string of LEDs 547-550 have a common negative terminal connected to a common current sense 104, with each string of LEDs 547-550 connected to a dedicated filter 555, 544, 545, 546. Each anode side of the LEDs 547-550 is connected separately to a multiplexer 553, which is considered part of an RGB (or RGBA) array controller 551, and which is coupled to controller 600 (e.g., via coupling 554). Using the multiplexer 553, each independent string of LEDs 547-550 is sequentially connected into the circuit for time division multiplexing, to receive current through the power switch 102.

The input of RGB controller 51 is connected to a blocking diode 507. The RGB array controller 551 is connected to external feedbacks 552 which may be a single tricolor optical sensor or multiple sensors including optical and thermal channels connected to the RGB array controller 551. A small capacitor 566 is connected at the secondary rails to discharge current during transients when none of the strings of the array of LEDs 547-550 is connected to the converter 760.

Figure 15:
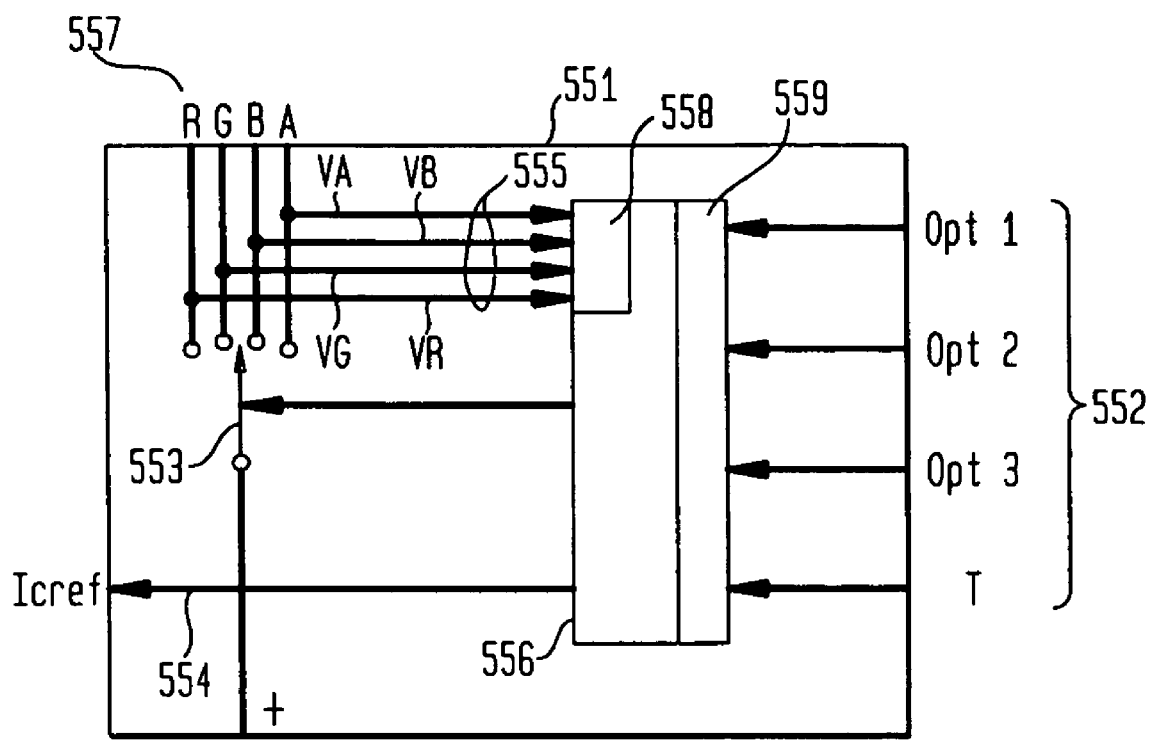
FIG. 15 is a block diagram of an exemplary array controller in accordance with the teachings of the present invention.

FIG. 15 is a block diagram of an exemplary array controller 551 in accordance with the teachings of the present invention. The RGB array controller 551 comprises a microprocessor 556, having stored LED models in memories 558 and 559 connected to electrical feedbacks 555 and external optical and temperature feedback channels 552, and having a first output of the microprocessor 556 output connected to control the multiplexer 553. A second output of microprocessor 556 is connected to converter 760 to adjust the reference of output current $I_{CREF}$. The multiplexer 553 is connected to the strings of RGBA LEDS and the positive rail of the converter 760.

In accordance with the exemplary embodiments of the present invention, as strings of RGB LEDs 547-550 are sequentially connected to the current source of converter 760, there should be no interruption of the current generated by converter 760. More than one string of RGB LEDs 547-550 should not receive current concurrently, as they may operate at substantially different voltages and such overlap may cause unwanted current spikes. When no string of the RGB LEDs 547-550 is connected via multiplexer 553 to receive current, any transients are damped into a small capacitor 566.

The microprocessor 556 can be configured to drive RGB based on any known LED driving technology, such as from Dialog semiconductor DA 9026. In the prior art, including referenced DA 9026, each RGB channel contains a dedicated analog current source driven by a microprocessor. Typically it has 4 bit resolution. The exemplary RGB array controller 551 of the present invention connects each RGB channel to the energy source one at a time, resulting in time division multiplexing of the supplied current. In order to achieve balance of power, the microprocessor 556 calculates a total amplitude of the current, which will be equally supplied to each channel. The amplitude of the current is adjusted through converter 760. The time, however, in which current is supplied to each channel is different; alternatively, each channel is regulated with an independent duration of time division multiplexing. The RGB array controller 551 regulates current in each channel by measuring a corresponding voltage across a string of LEDs and converting it into current, based on internal LED models (stored LED models in memories 558 and 559) adjusted by temperature feedback (T) of feedbacks 552. The frequency of multiplexer 553 will determine the current ripple in each channel and its resolution. As the frequency of the multiplexer 553 can be set very high (e.g., up to MHz), the power management component of the RGB array controller 551 will not be a limiting factor of the desired resolution. The exemplary RGB array controller 551 may be implemented with less complexity than known in the prior art, has very high boundaries for accuracy, and considered generally, is based on a single stage of power processing, eliminating a need of secondary current controllers and thus increasing the overall efficiency of LED driver.

Figure 16:
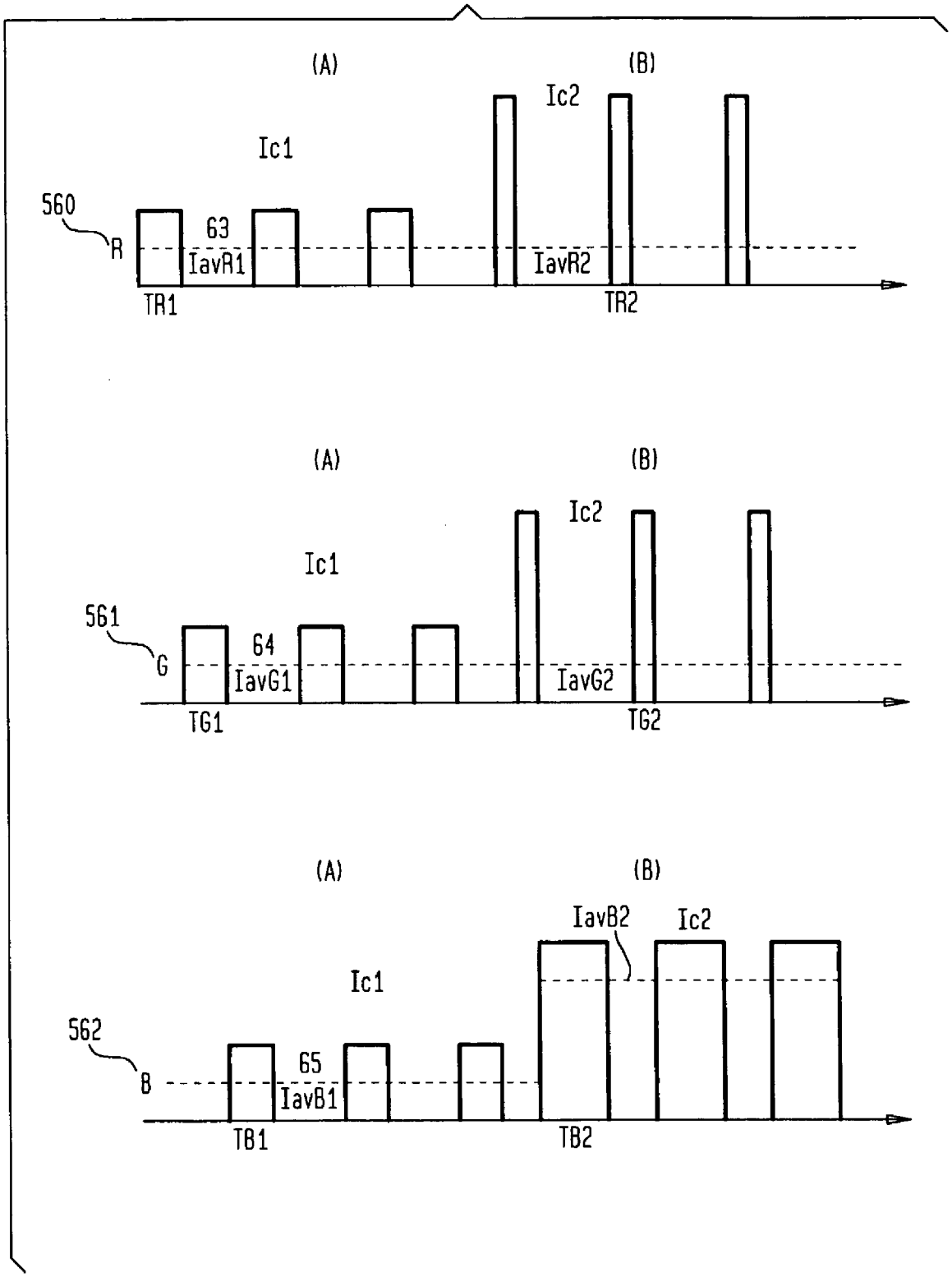
FIG. 16 is a graphical diagram of exemplary current pulses in an RGB LED array in accordance with the teachings of the present invention.
Figure 17A:
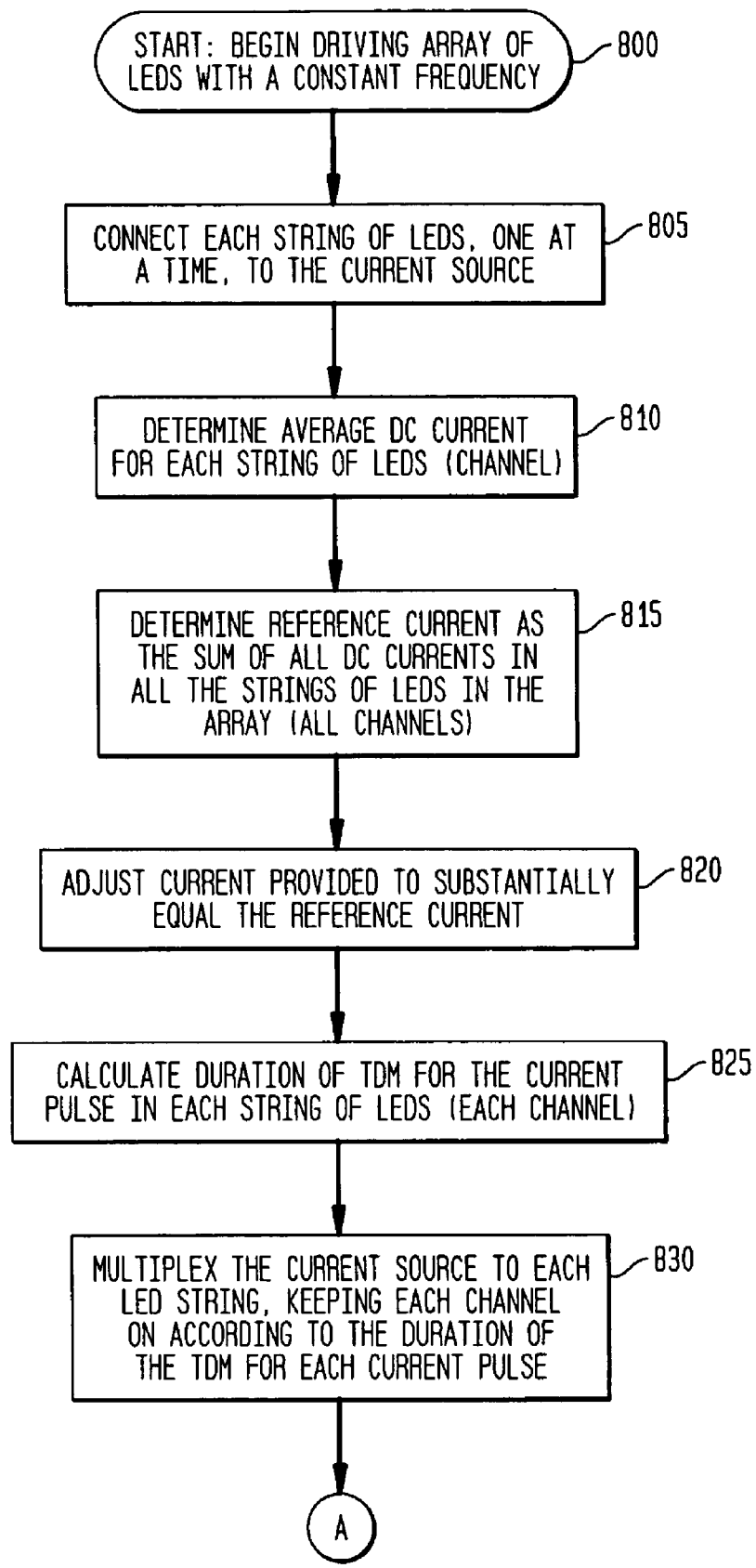

FIG. (or "FIG.") 16 is a graphical diagram of exemplary current pulses in an RGB LED array in accordance with the teachings of the present invention. As illustrated in part (A) of FIG. 16, initially current pulses through RGB channels 560-562 (e.g., corresponding to RGB LEDs 547-550) are shown equal and so are equal average current through these channels IavR1=IavG1=IavB1. Note that the amplitude of the current pulse Ic1 is the same for all channels. As illustrated in part (B) of FIG. 16, an average current increase has occurred in the B channel. The amplitude of the current Ic2 now is increased Ic2>Ic1. In order to preserve the average current in the R and G channels, the corresponding duration (of the time division multiplexing connections) is reduced inversely proportional to the $I_C$ increase, so IavR2=IavR1 and IavG1=IavG2, while, however, IavB2>IavB1.

FIG. 16 also illustrates graphically an exemplary one stage process of driving RGB LEDs in accordance with the present invention. Assuming that at each moment of time one of the channels is connected to the converter 760, then an average current trough each channel is (Equation 8):

$$IavR = Ic\frac{TR}{T}$$
$$IavG = Ic\frac{TG}{T}$$
$$IavB = Ic\frac{TB}{T}$$
(8)

where Ic is the current amplitude, TR is the duration of the time division multiplexing of the R channel, TG is the duration of the time division multiplexing of the G channel, and TB is the duration of the time division multiplexing of the B channel. These durations of time division multiplexing may then be expressed as (Equation 9):

$$TR = \frac{IavRT}{Ic}$$
$$TG = \frac{IavGT}{Ic}$$
$$TB = \frac{IavBT}{Ic}$$
(9)

Assuming the condition that at least one of the channels is always conducting the current, then (Equation 10):

$$TR+TG+TB=T \quad (10)$$

Substituting the values of TR, TG and TB from (9) into (10) provides (Equation 11):

$$Ic=IavR+IavG+IavB \quad (11)$$

Equations 11 and 9 are a theoretical definition of the exemplary inventive process, which is a functional implementation of amplitude modulation and time division multiplexing at the same time or physically modulation of the electrical charge delivered to each channel. FIG. (or "FIG.") 17 is a flow diagram of an exemplary method embodiment for controlling current to an array or plurality of strings of LEDs in accordance with the teachings of the present invention. According to the exemplary embodiments of the invention, an exemplary process of driving an array or plurality of strings of LEDs by a combined, simultaneous amplitude modulation and time division multiplexing, comprises the following steps discussed below. First, the cycle of driving an array or plurality of strings of LEDs with a constant frequency is started, step 800. Second, each string of LEDs, of the plurality of strings of LEDs, are connected one at a time to the regulated current source (with wide bandwidth to ensure good dynamic response), such that at any moment at least one string of LEDs is connected to the current source, step 805. Then, interfacing each cycle with the color control portion of the RGB array controller 551 and getting the average DC current in each channel for expected color and brightness, step 810. The reference of the current source $I_C$ is set as the sum of all DC currents in the regulated channels, step 815, and the current provided by the current source is adjusted to the $I_C$ current, step 820. The method then calculates the duration of the time division multiplexing of the current pulse in each channel as a product of required DC current and cycle time divided by the value of the $I_C$ current, step 825, and multiplexes the current source to each LED string, keeping each channel on according to the calculated duration of the time division multiplexing for the current pulse, step 830.

The methodology then measures the voltage across each string and converts it into a DC current of each string, using LED models adjusted by junction temperatures, step 835. The measured current is compared with the required current, and the $I_C$ amplitude or duration of the time division multiplexing is adjusted as may be necessary to minimize the discrepancy, step 840. At the end of cycle time, a new cycle is started.

The off line converters 150, 250, 350, 450, and 550 may now be characterized, introducing efficiency η and transformer ratio Kt. Assuming at the crest of maximum amplitude Vm the buck-boost converter operates in the critical conduction mode, the cycle time T is (Equation 12):

$$T = Ton\left(1 + \frac{Vm}{KtVout}\right) \quad (12)$$

-continued $$Iout = \frac{Vm^2 TonKt^2\eta}{4\left(1 + \frac{Vm}{KtVout}\right)LVout}\eta$$

$$L = \frac{Vm^2 TonKt^2}{4Pout\left(1 + \frac{Vm}{KtVout}\right)}$$

A numeric analysis of the expressions of Equation 12 demonstrate an impact of having a transformer in the converter (Kt.>1) on Peak current value, which is important for EMI of the converter.

TABLE 1

Buck-boost converter parameters:

| Kt | 1 | 10 |
|---|---|---|
| Vout, V | 12 | 12 |
| Iout, A | 1 | 1 |
| Pout, W | 12 | 12 |
| η | 0.9 | 0.9 |
| Vm, V | 200 | 200 |
| Pin, W | 13.3 | 13.3 |
| Ton, us | 1 | 4 |
| T, us | 17.6 | 10.7 us |
| L, uH | 43 uH | 563 uH |
| Im, mA | 133 | 133 |
| Ip, A | 4.7 A | 1.42 A |

From the Table 1 it follows that the peak switching current with Kt=1 (transformerless converter) is 35 times higher than amplitude of first harmonic. By introducing a transformer we could reduce this ratio to 10.6, a manageable number considering switching frequency around 100 kHZ. Apparently due to this factor transformerless buck-boost converters generally will have a practical limit of output power about 10 W. Anything above 10 W output power generally will require a transformer.

Figure 18A:
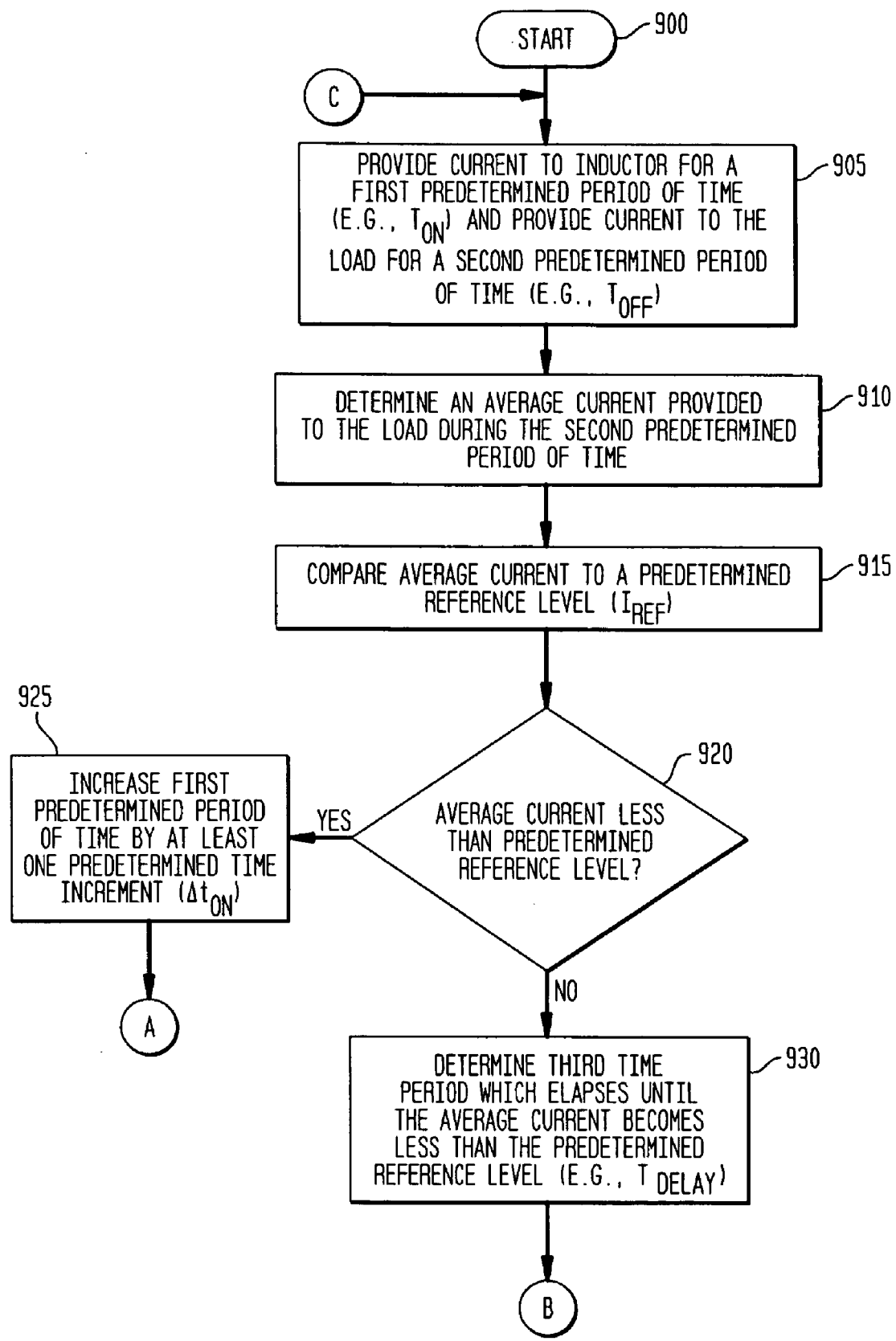
FIGS. 18A and 18B, is a flow diagram of an exemplary method embodiment for pulsed current averaging in accordance with the teachings of the present invention.
Figure 18B:
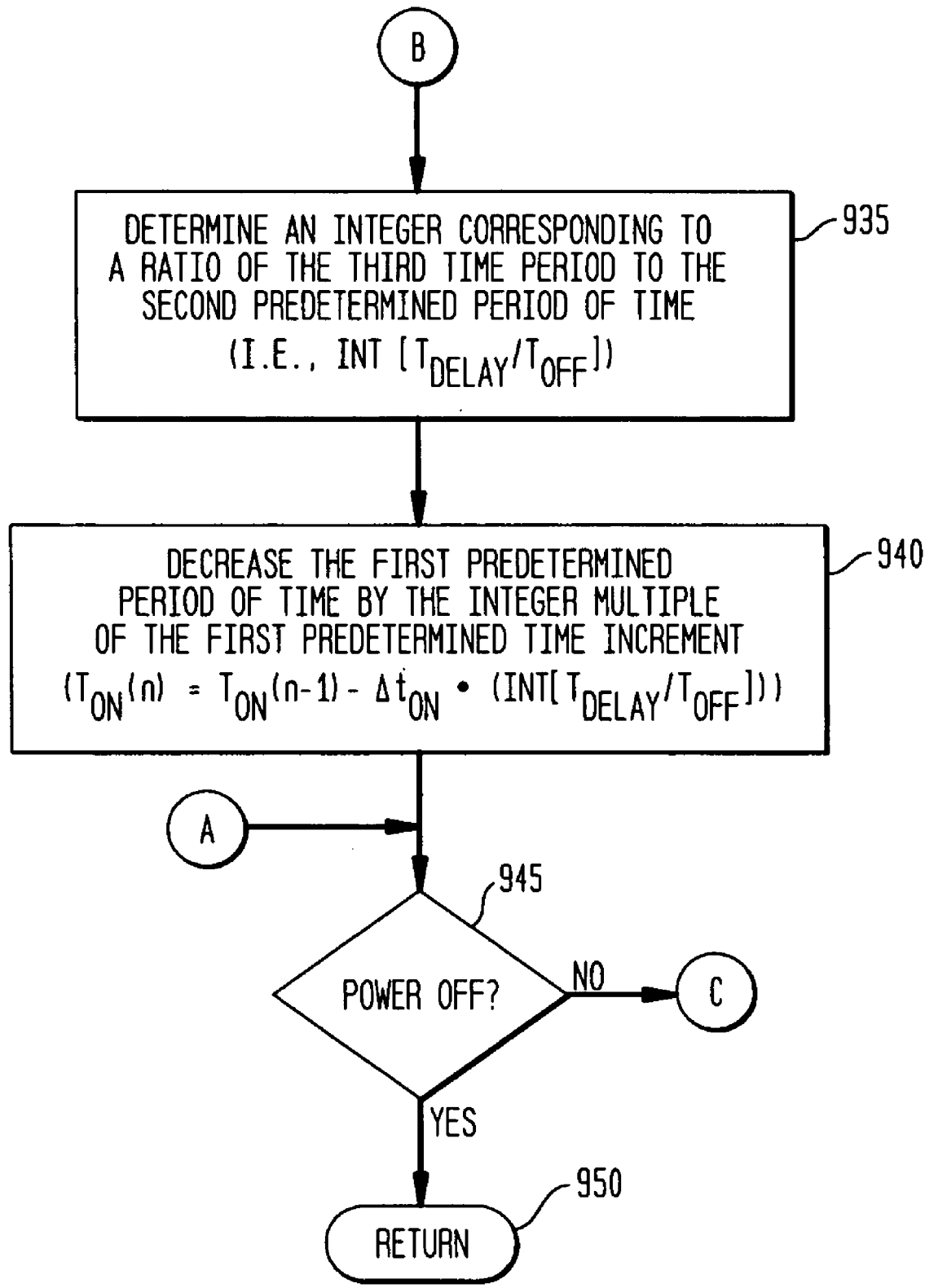

FIG. 18 is a flow diagram of an exemplary method embodiment for pulsed current averaging in accordance with the teachings of the present invention, and provides a useful summary. The exemplary method provides for regulating current in an electrical load, with the current provided to the electrical load via a switch. The exemplary method begins, start step 900, and provides current to the electrical load for a first predetermined period of time, e.g., $T_{ON}$, step 905. Following the first predetermined period of time, the method determines an average current provided to the electrical load during a second predetermined period of time, e.g., $T_{OFF}$, step 910. The average current is then compared to a predetermined reference level, step 915. When the average current is less than the predetermined reference level, step 920, the method proceeds to step 925, and increases the first predetermined period of time for a next cycle by at least one first predetermined time increment. When the average current is greater than the predetermined reference level during the second predetermined period of time in step 920, the method proceeds to step 930. In step 930, the method determines a third period of time which elapses until the average current becomes less than the predetermined reference level, e.g., $T_{DELAY}$. Next, an integer corresponding to a ratio of the third period of time to the second predetermined period of time is determined, step 935. Following step 935, the method then decreases the first predetermined period of time for the next cycle by the integer multiple of the first predetermined time increment, step 940. Following steps 925 or 940, the method returns to step 905, and the methodology iterates recursively, until the corresponding system is powered off, step 945, and the method may end, return step 950.

As discussed above, the method may also include, for successive cycles resulting in either consecutive increasing or consecutive decreasing of the first predetermined period of time, correspondingly successively increasing or successively decreasing the first predetermined period of time by a multiple of the first predetermined time increment, the multiple corresponding to the number of successive cycles.

Also as discussed above, when the electrical load is an array of independent pluralities of light emitting diodes of corresponding colors, the method may also include modulating a current amplitude and duration of the time division multiplexing for each independent plurality of light emitting diodes of the array; maintaining a substantially constant average current level to the plurality of light emitting diodes of the array; determining an average DC current for expected color and brightness for each independent plurality of light emitting diodes of the array; determining the predetermined reference level as the sum of all DC currents for each independent plurality of light emitting diodes of the array; determining the duration of the time division multiplexing of the current pulse for each independent plurality of light emitting diodes of the array as a product of its corresponding average DC current and cycle time divided by a value of the current corresponding to the predetermined reference level; and multiplexing a current source to each independent plurality of light emitting diodes of the array according to the calculated duration of the time division multiplexing for the corresponding current pulse.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method for regulating current in an electrical load, the current provided to the electrical load via a switch and an inductor, the method comprising:

providing current to the inductor for a first predetermined period of time;

following the first predetermined period of time, providing current to the electrical load and determining an average current provided to the electrical load during a second predetermined period of time;

comparing the average current to a predetermined reference level;

when the average current is less than the predetermined reference level, increasing the first predetermined period of time for a next cycle by at least one first predetermined time increment; and when the average current is greater than the predetermined reference level during the second predetermined period of time, determining a third period of time which elapses until the average current becomes less than the predetermined reference level, determining an integer corresponding to a ratio of the third period of time to the second predetermined period of time, and decreasing the first predetermined period of time for the next cycle by the integer multiple of the first predetermined time increment.

2. The method of claim 1, further comprising:
for successive cycles resulting in either consecutive increasing or consecutive decreasing of the first predetermined period of time, correspondingly successively increasing or successively decreasing the first predetermined period of time by a multiple of the first predetermined time increment, the multiple corresponding to the number of successive cycles.

3. The method of claim 1, wherein the first predetermined period of time is an on time of the switch and the second predetermined period of time is an off time of the switch.

4. The method of claim 3, wherein the third predetermined period of time is a variable delay period between the end of the off time and a start of a next on time of the switch.

5. The method of claim 1, wherein the electrical load is a plurality of light emitting diodes.

6. The method of claim 1, wherein the electrical load is an array of independent pluralities of light emitting diodes of corresponding colors, the method further comprising:
modulating a current amplitude and duration of time division multiplexing for each independent plurality of light emitting diodes of the array.

7. The method of claim 6, further comprising:
maintaining a substantially constant average current level to the plurality of light emitting diodes of the array.

8. The method of claim 6, further comprising:
determining an average DC current for expected color and brightness for each independent plurality of light emitting diodes of the array.

9. The method of claim 8, further comprising:
determining the predetermined reference level as the sum of all DC currents for each independent plurality of light emitting diodes of the array.

10. The method of claim 9, further comprising:
determining the duration of the time division multiplexing of the current pulse for each independent plurality of light emitting diodes of the array as a product of its corresponding average DC current and cycle time divided by a value of the current corresponding to the predetermined reference level.

11. The method of claim 10, further comprising:
multiplexing a current source to each independent plurality of light emitting diodes of the array according to the determined duration of the time division multiplexing of the corresponding current pulse.

12. The method of claim 11, further comprising:
measuring a voltage across each independent plurality of light emitting diodes of the array, and using the measured voltage and LED models adjusted by junction temperatures, determining a corresponding DC current for each independent plurality of light emitting diodes of the array.

13. The method of claim 12, comparing the corresponding DC current to a required current level and correspondingly adjusting the current amplitude or duration of the time division multiplexing.

14. A system for regulating current in an electrical load, the system comprising:
a converter coupled to the electrical load, the converter comprising a switch and an inductor to provide current to the electrical load; and
a first controller coupled to the converter, the first controller to control the switch to provide current to the inductor for a first predetermined period of time and to provide current to the electrical load for a second predetermined period of time; to determine an average current provided to the electrical load during the second predetermined period of time; to compare the average current to a predetermined reference level; the first controller, when the average current is less than the predetermined reference level, to increase the first predetermined period of time for a next cycle by at least one first predetermined time increment, and when the average current is greater than the predetermined reference level during the second predetermined period of time, to determine a third period of time which elapses until the average current becomes less than the predetermined reference level, to determine an integer corresponding to a ratio of the third period of time to the second predetermined period of time, and to decrease the first predetermined period of time for the next cycle by the integer multiple of the first predetermined time increment.

15. The system of claim 14, wherein the first controller, for successive cycles resulting in either consecutive increasing or consecutive decreasing of the first predetermined period of time, further is to correspondingly successively increase or successively decrease the first predetermined period of time by a multiple of the first predetermined time increment, the multiple corresponding to the number of successive cycles.

16. The system of claim 14, wherein the first predetermined period of time is an on time of the switch the second predetermined period of time is an off time of the switch.

17. The system of claim 16, wherein the third predetermined period of time is a variable delay period between the end of the off time and a start of a next on time of the switch.

18. The system of claim 14, wherein the electrical load is a plurality of light emitting diodes.

19. The system of claim 14, wherein the electrical load is an array of independent pluralities of light emitting diodes of corresponding colors, and further comprising:
a second controller coupled to the array, the second controller to modulate a current amplitude and a duration of time division multiplexing for each independent plurality of light emitting diodes of the array.

20. The system of claim 19, further comprising:
a multiplexer coupled to the second controller, the multiplexer to switch current successively to each independent plurality of light emitting diodes of the array.

21. The system of claim 20, wherein the first controller further is to maintain a substantially constant average current level to the plurality of light emitting diodes of the array.

22. The system of claim 21, wherein the second controller further is to determine an average DC current for expected color and brightness for each independent plurality of light emitting diodes of the array.

23. The system of claim 22, wherein the first controller or the second controller further is to determine the predetermined reference level as the sum of all DC currents for each independent plurality of light emitting diodes of the array.

24. The system of claim 22, wherein the second controller further is to determine the duration of the time division multiplexing of a current pulse for each independent plurality of light emitting diodes of the array as a product of its corresponding average DC current and cycle time divided by a value of the current corresponding to the predetermined reference level.

25. The system of claim 24, wherein the multiplexer further is to switch a current source to each independent plurality of light emitting diodes of the array according to the determined duration of the time division multiplexing of the corresponding current pulse.

26. The system of claim 24, wherein the second controller further is to measure a voltage across each independent plurality of light emitting diodes of the array, and using the measured voltage and LED models adjusted by junction temperatures, to determine a corresponding DC current for each independent plurality of light emitting diodes of the array.

27. The system of claim 26, wherein the second controller further is to compare the corresponding DC current to a required current level and to correspondingly adjust the current amplitude or duration of the time division multiplexing.

28. The system of claim 19, wherein the first controller and the second controller are embodied as a single controller.

29. The system of claim 14, wherein the first controller further is to determine the first predetermined period of time, the second predetermined period of time, and the first predetermined time increment as corresponding clock cycles.

30. The system of claim 14, wherein the first controller further comprises:
  an integrator to determine the average current;
  a comparator coupled to the integrator, the comparator to compare the average current to the predetermined reference level; and
  digital logic coupled to the comparator, the digital logic to determine an increase or a decrease in the first predetermined period of time and to control an on time of the switch.

31. An apparatus for regulating current in an electrical load, the apparatus for coupling to a converter to provide current to the electrical load through a switch and an inductor, the apparatus comprising:
  digital logic to control the switch to provide current to the inductor for a first predetermined period of time and to provide current to the electrical load for a second predetermined period of time;
  an integrator to determine an average current during the second predetermined period of time; and
  a comparator coupled to the integrator and to the digital logic, the comparator to compare the average current to a predetermined reference level;
  wherein the digital logic, when the average current is less than the predetermined reference level, further is to increase the first predetermined period of time for a next cycle by at least one first predetermined time increment, and when the average current is greater than the predetermined reference level during the second predetermined period of time, to determine a third period of time which elapses until the average current becomes less than the predetermined reference level, to determine an integer corresponding to a ratio of the third period of time to the second predetermined period of time, and to decrease the first predetermined period of time for the next cycle by the integer multiple of the first predetermined time increment.

32. The apparatus of claim 31, wherein the digital logic, for successive cycles resulting in either consecutive increasing or consecutive decreasing of the first predetermined period of time, further is to correspondingly successively increase or successively decrease the first predetermined period of time by a multiple of the first predetermined time increment, the multiple corresponding to the number of successive cycles.

33. The apparatus of claim 31, wherein the first predetermined period of time is an on time of the switch, wherein the second predetermined period of time is an off time of the switch, and wherein the third predetermined period of time is a variable delay period between the end of the off time and a start of a next on time of the switch.

34. The apparatus of claim 31, wherein the electrical load is a plurality of light emitting diodes.

35. The apparatus of claim 31, wherein the electrical load is an array of independent pluralities of light emitting diodes of corresponding colors, and further comprising:
  an array controller coupled to the array, the array controller to modulate a current amplitude and duration of time division multiplexing for each independent plurality of light emitting diodes of the array.

36. The apparatus of claim 35, further comprising:
  a multiplexer coupled to the array controller, the multiplexer to switch current successively to each independent plurality of light emitting diodes of the array.

37. The apparatus of claim 35, wherein the digital logic further is to maintain a substantially constant average current level to the plurality of light emitting diodes of the array.

38. The apparatus of claim 37, wherein the array controller further is to determine an average DC current for expected color and brightness for each independent plurality of light emitting diodes of the array.

39. The apparatus of claim 38, wherein the digital logic or the array controller further is to determine the predetermined reference level as the sum of all DC currents for each independent plurality of light emitting diodes of the array.

40. The apparatus of claim 39, wherein the array controller further is to determine the duration of the time division multiplexing of a current pulse for each independent plurality of light emitting diodes of the array as a product of its corresponding average DC current and cycle time divided by a value of the current corresponding to the predetermined reference level.

41. The apparatus of claim 40, wherein the multiplexer further is to switch a current source to each independent plurality of light emitting diodes of the array according to the calculated duration of the time division multiplexing of the corresponding current pulse.

42. The apparatus of claim 41, wherein the array controller further is to measure a voltage across each independent plurality of light emitting diodes of the array, and using the measured voltage and LED models adjusted by junction temperatures, to determine a corresponding DC current for each independent plurality of light emitting diodes of the array.

43. The apparatus of claim 42, wherein the array controller further is to compare the corresponding DC current to a required current level and to correspondingly adjust the current amplitude or duration of the time division multiplexing.

44. A method of regulating current in an array of independent pluralities of light emitting diodes of corresponding colors, the method comprising:
  modulating a current amplitude and a duration of time division multiplexing for each independent plurality of light emitting diodes of the array;
  maintaining a substantially constant average current level to the plurality of light emitting diodes of the array;
  determining an average DC current for expected color and brightness for each independent plurality of light emitting diodes of the array; and
  determining a predetermined reference level as the sum of all DC currents for each independent plurality of light emitting diodes of the array.

45. The method of claim 44, further comprising:
  determining the duration of the time division multiplexing of a current pulse for each independent plurality of light emitting diodes of the array as a product of its corresponding average DC current and cycle time divided by a value of the current corresponding to the predetermined reference level.

46. The method of claim 45, further comprising:
multiplexing a current source to each independent plurality of light emitting diodes of the array according to the determined duration of the time division multiplexing of the corresponding current pulse.

47. The method of claim 44, further comprising:
providing current to an inductor for a first predetermined period of time;
providing current to the array of independent pluralities of light emitting diodes for a second predetermined period of time;
determining an average current provided to the array of independent pluralities of light emitting diodes during the second predetermined period of time;
comparing the average current to the predetermined reference level;
when the average current is less than the predetermined reference level, increasing the first predetermined period of time for a next cycle by at least one first predetermined time increment;
when the average current is greater than the predetermined reference level during the second predetermined period of time, determining a third period of time which elapses until the average current becomes less than the predetermined reference level, determining an integer corresponding to a ratio of the third period of time to the second predetermined period of time, and decreasing the first predetermined period of time for the next cycle by the integer multiple of the first predetermined time increment.

48. The method of claim 47, further comprising:
for successive cycles resulting in either consecutive increasing or consecutive decreasing of the first predetermined period of time, correspondingly successively increasing or successively decreasing the first predetermined period of time by a multiple of the first predetermined time increment, the multiple corresponding to the number of successive cycles.

49. A system for regulating current in an array of independent pluralities of light emitting diodes of corresponding colors, the system comprising:
a multiplexer to switch current to each independent plurality of light emitting diodes of the array;
a first controller to maintain a substantially constant average current level to the plurality of light emitting diodes of the array; and
a second controller coupled to the multiplexer and to the first controller, the second controller to modulate a current amplitude and a duration of time division multiplexing of current for each independent plurality of light emitting diodes of the array, to determine an average DC current for expected color and brightness for each independent plurality of light emitting diodes of the array, and to determine a predetermined reference level as the sum of all DC currents for each independent plurality of light emitting diodes of the array.

50. The system of claim 49, wherein the second controller further is to determine the duration of the time division multiplexing of a current pulse for each independent plurality of light emitting diodes of the array as a product of its corresponding average DC current and cycle time divided by a value of the current corresponding to the predetermined reference level.

51. The system of claim 50, wherein the multiplexer further is to switch a current source to each independent plurality of light emitting diodes of the array according to the determined duration of the time division multiplexing of the corresponding current pulse.

52. The system of claim 51, wherein the second controller further is to measure a voltage across each independent plurality of light emitting diodes of the array, and using the measured voltage and LED models adjusted by junction temperatures, to determine a corresponding DC current for each independent plurality of light emitting diodes of the array.

53. The system of claim 52, wherein the second controller further is to compare the corresponding DC current to a required current level and to correspondingly adjust the current amplitude or duration of the time division multiplexing.

54. The system of claim 49, wherein the first controller further is to provide current to an inductor for a first predetermined period of time and to provide current to the array of independent pluralities of light emitting diodes for a second predetermined period of time; to determine an average current provided to the array of independent pluralities of light emitting diodes during the second predetermined period of time; to compare the average current to a predetermined reference level; when the average current is less than the predetermined reference level, to increase the first predetermined period of time for a next cycle by at least one first predetermined time increment; and when the average current is greater than the predetermined reference level during the second predetermined period of time, to determine a third period of time which elapses until the average current becomes less than the predetermined reference level, to determine an integer corresponding to a ratio of the third period of time to the second predetermined period of time, and to decrease the first predetermined period of time for the next cycle by the integer multiple of the first predetermined time increment.

55. The system of claim 54, wherein the first controller, for successive cycles resulting in either consecutive increases or consecutive decreases of the first predetermined period of time, further is to correspondingly successively increase or successively decrease the first predetermined period of time by a multiple of the first predetermined time increment, the multiple corresponding to the number of successive cycles.

* * * * *